United States Patent [19]

Wright

[11] Patent Number: 5,081,083
[45] Date of Patent: Jan. 14, 1992

[54] METHOD OF TREATING INTERMETALLIC ALLOY HYDROGENATION/OXIDATION CATALYSTS FOR IMPROVED IMPURITY POISONING RESISTANCE, REGENERATION AND INCREASED ACTIVITY

[75] Inventor: Randy B. Wright, Idaho Falls, Id.

[73] Assignee: The United States of America as represented by the Secretary of the Department of Energy, Washington, D.C.

[21] Appl. No.: 478,400

[22] Filed: Feb. 12, 1990

[51] Int. Cl.$^5$ .................. B01J 23/96; B01J 23/94; B01J 23/84; B01J 23/64

[52] U.S. Cl. .......................... 502/50; 502/38; 502/52; 502/53; 502/324; 502/325; 502/327; 502/337; 502/339; 502/349; 502/350; 502/353; 502/517; 585/275; 585/276; 585/277

[58] Field of Search ............... 502/325, 337, 339, 349, 502/350, 315, 324, 50, 53, 38, 517, 52

[56] References Cited

U.S. PATENT DOCUMENTS

| | | | |
|---|---|---|---|
| 2,564,331 | 8/1951 | Hawley | 502/337 |
| 3,235,515 | 2/1966 | Taylor | 502/337 |
| 3,746,658 | 7/1973 | Porta et al. | 502/219 |
| 3,922,300 | 11/1975 | Ohona et al. | 560/261 |
| 4,002,658 | 1/1977 | Dalla Betta et al. | 518/705 |
| 4,071,473 | 1/1978 | Atkinson et al. | 502/302 |
| 4,189,405 | 2/1980 | Khapton et al. | 502/332 |
| 4,233,185 | 11/1980 | Khapton et al. | 502/302 |
| 4,287,095 | 9/1981 | Atkinson et al. | 502/328 |
| 4,301,032 | 11/1981 | Atkinson et al. | 502/325 |
| 4,514,520 | 4/1985 | Uytterhoeven et al. | 502/337 |
| 4,724,227 | 2/1988 | Kukes et al. | 502/213 |

OTHER PUBLICATIONS

Bureau of Mines Report under Contract No. J0134035, "Stragegic And Critical Materials Program Annual Report", May 1985.

Eleventh North American Meeting Of The Catalysis Society, May 7-11, 1989, "Catalytic Hydrogenation Activity, Sulfur Poisoning And Regeneration of Ti, Zr, Hf/Ni Intermetallic Compounds".

Wright et al., "Catalytic Hydrogenation Activity Of A $ZrNi_3$ Intermetallic Alloy", J. Vac. Sci., Technol. A 5(4), Jul./Aug. 1987.

Cocke et al., "The Surface Oxidation And Reduction Chemistry Of Zirconium-Nickel Compounds Examined By XPS", Applied Surface Science 31 (1988) 341-369.

Wright et al., "X-Ray Photoelectron Spectroscopy And Auger Studies Of Selected Zr/Ni Intermetallic Alloy Catalysts", J. Vac. Sci. Technol.A 5(4), Jul.-/Aug. 1987.

Primary Examiner—Paul E. Konopka
Attorney, Agent, or Firm—Hugh W. Glenn; Robert J. Fisher; William R. Moser

[57] ABSTRACT

Alternate, successive high temperature oxidation and reduction treatments, in either order, of intermetallic alloy hydrogenation and intermetallic alloy oxidation catalysts unexpectedly improves the impurity poisoning resistance, regeneration capacity and/or activity of the catalysts. The particular alloy, and the final high temperature treatment given alloy (oxidation or reduction) will be chosen to correspond to the function of the catalyst (oxidation or hydrogenation).

14 Claims, 23 Drawing Sheets

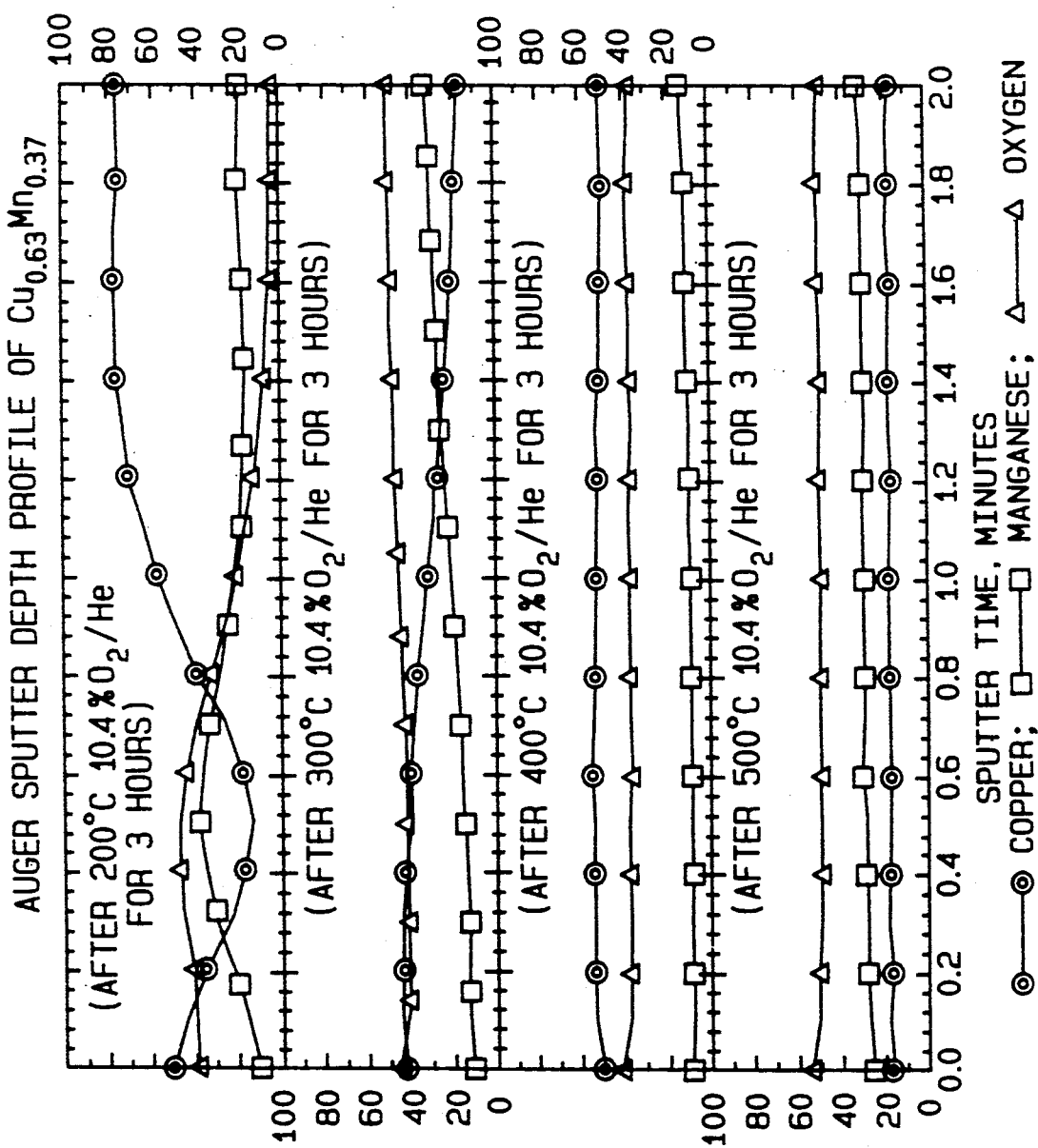

METHOD OF TREATING INTERMETALLIC ALLOY HYDROGENATION/OXIDATION CATALYSTS FOR IMPROVED IMPURITY POISONING RESISTANCE, REGENERATION AND INCREASED ACTIVITY

CONTRACTUAL ORIGIN OF THE INVENTION

The United States Government has rights in this invention made with the support of the U.S. Bureau of Mines pursuant to Contract No. DE-AC07-76ID01570 between the U.S. Department of Energy and the EG&G Idaho, Inc.

FIELD OF THE INVENTION

The present invention is directed to a method of treating intermetallic alloy hydrogenation/oxidation catalysts with successive oxidation and hydrogenation steps at increased temperature to make the intermetallic alloy hydrogenation or oxidation catalysts less susceptible to deactivation by gas impurities, such as hydrogen sulfide; to increase the ability of the hydrogenation and oxidation catalysts to regenerate after sulfur poisoning; and to increase the activity of the hydrogenation and oxidation catalysts to a point close to their original activities after gas impurity poisoning and regeneration. The treatment processes of the present invention are particularly useful for nickel-containing intermetallic alloy hydrogenation catalysts and platinum-containing intermetallic alloy hydrogenation catalysts and best results are obtained for the zirconium/nickel intermetallic alloy hydrogenation catalysts.

BACKGROUND OF THE INVENTION AND PRIOR ART

Various metals, particularly noble metals such as platinum and nickel, are known to be useful as hydrogenation catalysts in various catalytic hydrogenation reactions carried out in the gaseous phase. For example, such hydrogenation catalysts are extensively used in the hydrogenation of a variety of unsaturated hydrocarbon gases, such as ethylene to form their saturated counterparts, such as ethane. A number of intermetallic alloy hydrogenation catalysts have been developed for this purpose in order to provide a catalytic material that has sufficient hydrogenation activity by virtue of a surface layer of the active noble metal, or other catalytic metal, yet is much more inexpensive to manufacture and replace after deactivation because of its alloy association with another, less expensive metal. Many nickel intermetallic alloys and platinum intermetallic alloys are well known hydrogenation catalysts, particularly the zirconium/nickel intermetallic alloys and the zirconium/platinum intermetallic alloys, as evidenced by the following prior art patents: Hawley U.S. Pat. No. 2,564,331; Taylor U.S. Pat. No. 3,235,515; Porta et al U.S. Pat. No. 3,746,658 and Dalla Betta et al U.S. Pat. No. 4,002,658.

Some of the most important properties necessary for hydrogenation and oxidation catalysts to be successful on a commercial basis are the hydrogenation or oxidation activity, the ability of the catalyst to resist gas impurity poisoning, particularly sulfur poisoning, and the ability of the hydrogenation or oxidation catalyst to be regenerated for further use after the catalyst has been deactivated by reaction with some impurity in the reaction gas stream, particularly the ability to regenerate after sulfur poisoning.

In accordance with the present invention treatment of an intermetallic alloy hydrogenation or oxidation catalyst by alternate oxidation and reduction steps, in either order, in at least a two-step process, preferably at least a three-step process, substantially and unexpectedly increases the ability of the hydrogenation or oxidation catalyst to resist deactivation by reaction with gaseous impurities, particularly hydrogen sulfide; increases the hydrogenation or oxidation activity of the catalyst; and unexpectedly enables the deactivated catalyst to be regenerated.

SUMMARY OF THE INVENTION

In brief, the present invention is directed to a method of treating intermetallic alloy catalysts with alternate, successive high temperature oxidation and reduction treatments, in either order. The successive alternate oxidation/reduction treatments unexpectedly create a stratification of alloy metals, segregating the active metal to the surface, thereby increasing the activity of the catalyst, and unexpectedly increasing the impurity poisoning resistance and regeneration capacity for both oxidation and reduction intermetallic alloy catalysts. The oxidation and reduction steps of the present invention treat intermetallic alloy hydrogenation and oxidation catalysts in either a two-step or three-step process by alternating, successive, high temperature oxidation and reduction treatments, in either order. The three-step treatment is a high temperature oxidation step followed by a high temperature reduction step followed by a high temperature oxidation step; or a high temperature reduction step followed by a high temperature oxidation step followed by a high temperature reduction step. The two-step process can be a high temperature oxidation step followed by a high temperature reduction step; or a high temperature reduction step followed by a high temperature oxidation step. Both the two and three-step treatment processes enable the intermetallic alloy hydrogenation and oxidation catalysts to resist deactivation by gas impurities, such as hydrogen sulfide, that are present in a reaction stream; enable the catalyst to be regenerated to a point at, or near its original activation level and increase the activity of the intermetallic alloy catalysts.

Accordingly, an object of the present invention is to provide a new and improved method of treating intermetallic alloy catalysts, either in supported or unsupported form, with alternate successive reduction and oxidation treatments, in either order to increase the catalyst activity and/or regeneration capability, and/or resist deactivation by gas impurities.

Another object of the present invention is to provide a new and improved method of treating intermetallic alloys with alternate, successive reduction and oxidation treatments, in either order, in a two or three step process to achieve stratification of the alloy metals, thereby segregating one of the alloy metals to the surface of the alloy to produce corrosion-resistant and/or wear resistant metallic materials.

Still another object of the present invention is to provide a new and improved method of treating intermetallic alloy hydrogenation and/or oxidation catalysts.

The above and other objects and advantages of the present invention will become apparent from the following detailed description of the present invention taken in conjunction with the following drawings.

BRIEF DESCRIPTION OF THE DRAWINGS

FIG. 23 is a graph similar to FIGS. 21 and 22 for a similarly treated $Cu_{0.63}Mn_{0.37}$ alloy.

DETAILED DESCRIPTION OF THE PREFERRED EMBODIMENTS

Figure 1:
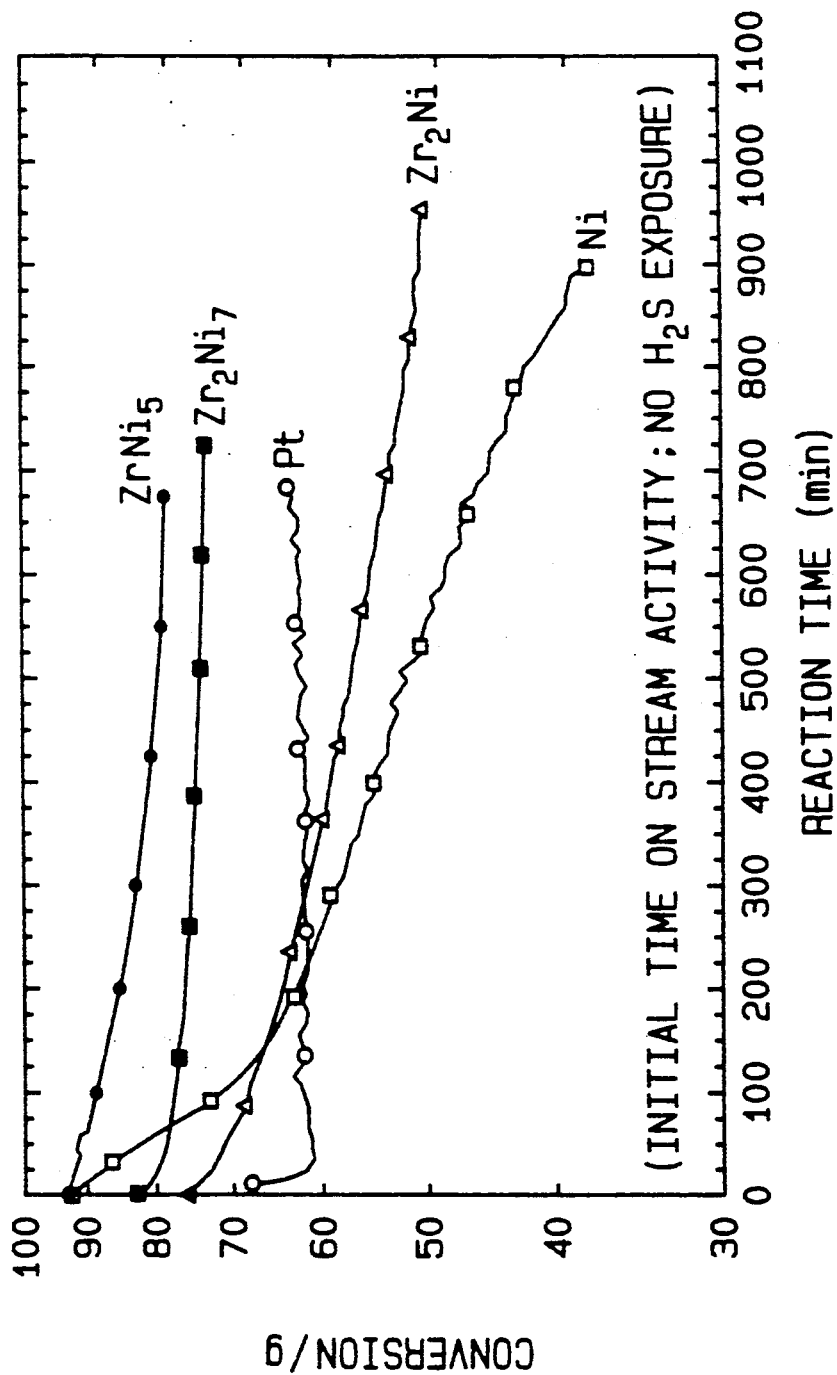
FIG. 1 is a graph showing the catalytic hydrogenation activity at 90° C. as a function of reaction time for pure Pt, pure Ni, and intermetallic alloys; Ni after 400° C. $H_2$ for 2 hours, $ZrNi_5$, $Zr_2Ni_7$ and $Zr_2Ni$ after 550° C. $O_2 + 400°$ C. $H_2$ for 2 hours each.

In accordance with the present invention, it has been found that alternate, successive high temperature oxidation and reduction treatments, in either order, of intermetallic alloy hydrogenation and intermetallic alloy oxidation catalysts unexpectedly improve the impurity poisoning resistance, regeneration capacity and/or activity of the catalysts. The particular alloy, and the final high temperature treatment given the alloy (oxidation or reduction) will be chosen to correspond to the function of the catalyst (oxidation or hydrogenation). The process of the present invention is effective for supported catalysts, where the active catalyst is dispersed on a high surface area metallic support material, and unsupported catalysts.

The successive, alternate high temperature oxidation and reduction treatments have been found to extensively alter the morphology of the intermetallic alloys resulting in a "sponge-like" surface having an unexpected increase in intermetallic alloy surface area and high catalytic activity. Studies of the surface composition (the outermost 5-30 Angstroms of material) show that the successive oxidation/reduction or reduction/oxidation treatments cause the intermetallic alloys to decompose into a surface layer rich in the active metal that has segregated to the surface (e.g., Ni, Pt and the like) dispersed on and bound to a stable oxide of the other alloying metal. In the case of a supported catalyst, these two layers are disposed over the support metal with the metal oxide bound very securely to the bulk support alloy.

This chemically induced compositional stratification of the alloys, which gives rise to the "sponge-like" active metal outer surface, results in the greatly increased catalytic hydrogenation/oxidation activity. The chemically induced decomposition and subsequent surface compositional stratification of the alloys in accordance with the present invention also is useful in the design and preparation of corrosion resistant coatings and for wear resistance on metallic alloy surfaces undergoing friction and other wear phenomena.

Intermetallic alloy hydrogenation catalysts of particular interest include $ZrNi_5$, $Zr_2Ni_7$, $Zr_2Ni$, $HfNi_3$, $TiNi_3$, $MoNi$, $NbNi_3$, $MnNi$, $AlNi_3$, $Si_2Ni$, $TiNi$, $TiPt_3$, $ZrPt_3$ and $HfPt_3$. Any other intermetallic alloy hydrogenation catalysts also will benefit in increased activity, regeneration capability and/or resistance to impurity poisoning when treated in accordance with the methods of the present invention. Oxidation catalysts of particular interest in accordance with the present invention include $CuMn_2O_4$, $CuMn$, $Cu_{0.63}Mn_{0.37}$ and any other intermetallic alloy oxidation catalysts. The hydrogenation catalysts are treated with a reducing gas as the final step whereas the oxidation catalysts are treated with an oxidizing gas as the final step in accordance with the principles of the present invention.

It has been shown that intermetallic alloy hydrogenation or oxidation catalysts, particularly the Zr/Ni alloy hydrogenation catalysts (for example, $ZrNi_5$, $Zr_2Ni_7$, $ZrNi_3$, $ZrNi$ and $Zr_2Ni$) exhibit significant catalytic hydrogenation activity when pre-activated in an oxygen-containing gas at a temperature of at least about 200° C., preferably about 400° C. to about 550° C., followed by a reductive treatment in a hydrogen-containing gas at a temperature of at least about 200° C., preferably at a temperature of at least about 400° C.. Similar, but better results are obtained by a three step pre-activation treatment. To achieve the full advantages of the present invention, the catalyst is pre-activated by exposure to a hydrogen-containing gas, such as a mixture of hydrogen and carbon monoxide having a mole ratio of $H_2/CO$ of about 1 to about 10, preferably about 3, at a temperature of at least 200° C., preferably at least about 350° C. and best at a temperature of at least about 400° C., followed by a 1% by volume $O_2$/99% by volume He gas mixture treatment at a temperature of at least about 200° C., preferably at a temperature of about 400° C. to about 750° C., in turn followed by a $H_2$ gas-containing stream at a temperature of at least about 200° C., preferably about 400° C. to about 550° C. The measured hydrogenation activities for the conversion of ethylene to ethane were greater (depending on reaction temperature) than those of either pure (i.e., unsupported) Ni or Pt. Of the Zr/Ni compounds studied, $Zr_2Ni_7$ is the most active. Other intermetallic alloy hydrogenation catalysts also provide significant improvement in activity, impurity poisoning resistance, and/or regeneration capability, such as: $TiNi$, $TiNi_3$, $HfNi_3$, $NbNi_3$, $MoNi$, $MnNi$, $AlNi_3$, $Si_2Ni$, $TiPt_3$, $ZrPt_3$, and $HfPt_3$, and were also shown to be active hydrogenation catalysts, but less active than the Zr/Ni intermetallics.

For the following intermetallic alloy catalysts, and using initial pre-activation treatments of (1) 550° C. $O_2$ and (2) 400° C. $H_2$, for 2 hours each, the following relative activity relationship as a function of reaction time was determined on a per weight basis for ethylene hydrogenation at 90° C.: $ZrNi_5 > Zr_2Ni_7 > Pt$, $Zr_2Ni > Ni$, $HfNi_3 > TiNi_3 > MoNi > NbNi_3 > MnNi > AlNi_3 > Si_2Ni > TiNi$.

In certain industrial processes it is necessary for a catalyst to resist deactivation (i.e., poisoning) by impurities, particularly sulfur-bearing molecules in the reactant stream, such as $H_2S$ or $SO_2$, so that the intermetallic compounds also were studied after sulfur poisoning. Pure Ni and Pt were both rapidly poisoned (to zero activity) by small amounts of $H_2S$ gas injected directly into the $He/H_2/C_2H_4$ reactant stream during the hydrogenation of ethylene to ethane at 90° C. The pre-activated $ZrNi_5$, $Zr_2Ni_7$, and $Zr_2Ni$ required considerably more $H_2S$ gas, on a per weight basis, before their hydrogenation activities were reduced to 1% of their initial values under the same reaction conditions. The $TiNi_3$ (the activity of $TiNi$ was too low to study for its poisoning resistance) and $HfNi_3$ compounds were similarly studied and exhibited better sulfur poisoning resistance than the pure Ni or Pt but not as good as the Zr/Ni intermetallic alloys. $NbNi_3$, $MoNi$, and $MnNi$ as well as $TiPt_3$, $ZrPt_3$, and $HfPt_3$ also were studied for their sulfur poisoning resistance. Upon comparing the pure Ni with the nickel-containing compounds, the following ordering of the $H_2S$ poisoning resistance was determined: $Zr_2Ni_7 > ZrNi_5 > Zr_2Ni > HfNi_5 > Ni > MoNi > NbNi_3 > TiNi_3$, based on a pre-activation with 550° C. $O_2$ + 400° C. $H_2$ for 2 hours each for the compounds. A similar comparison between the pure Pt and the platinum-containing intermetallic alloys results in the following ordering of $H_2S$ poisoning resistance: $TiPt_3 > Pt > \simeq ZrPt_3 > HfPt_3$. Even though the initial activity of the pure Pt was greater than the compounds, it was more rapidly poisoned than any of the three intermetallic alloys studied.

Extensive studies also were made of the regeneration properties of the materials once they had been poisoned by sulfur adsorbed from $H_2S$. A number of different treatments were studied which included varying the gas composition, temperature, and duration. Pure Pt and three platinum-containing compounds ($TiPt_3$, $ZrPt_3$, and $HfPt_3$) were effectively reactivated using a 550° C. $O_2$ treatment, and a 400° C. $H_2$ treatment, 2 hours for each sequential treatment, but the activity levels to which the pure Pt could be reactivated were greater than any of the platinum-containing intermetallic alloys. For the Ni-containing intermetallic alloys, the relative effectiveness of the regeneration treatments tried following $H_2S$ exposure during the hydrogenation of ethylene to ethane, in descending order, is:

(1) 400° C. $H_2/CO$ treatment mole ratio=3; followed by a treatment with 550° C. 1% $O_2$/99% He; followed by treatment with 400° C. $H_2$ (2) 500° C. 1% $O_2$/ 99% He treatment; followed by treatment with 400° C. $H_2$ (3) 550° C. $O_2$ treatment; followed by treatment with 400° C. $H_2$ (4) 400° C. $H_2$; and (5) 575° C. $H_2$ There appears to be no real advantage in treatment times longer than 1 to 2 hours. Pure Ni could not be successfully reactivated using any of these treatments. Thus, all of the Ni-containing intermetallic alloys are better than pure Ni with respect to regenerability.

The effects of the pre-activation and regeneration treatment on the surface composition and physical morphology of the materials also were studied. Scanning electron microsopy (SEM) showed the morphology of the alloys after oxidation/reduction treatment to be extensively altered, resulting in a "sponge-like" surface. The attendant increase in the surface area of the alloys may account for, in part, their high catalytic activity. Scanning Auger microscopy (SAM) and x-ray photoelectron spectroscopy (XPS) in conjunction with sputter ion depth profiling were used to investigate changes in the surface composition (outermost 5-30 Angstroms). In all of the nickel-containing alloys studied to date, the oxidation/reduction treatments caused the alloy surface to decompose into a nickel-rich surface layer residing on a stable oxide of the other alloying element. This chemically induced compositional stratification of the alloys results in the greatly increased catalytic hydrogenation activity.

CATALYST PREPARATION AND TESTING

The intermetallic compounds were prepared, using conventional arc melting techniques, in a helium or argon gas-purged arc melter equipped with a tungsten stinger, as well known in the art, to prepare sample "buttons" of the intermallic alloys. Supported catalysts have been prepared using aqueous precipitation (with hydroxide and oxalate ions) and aqueous freeze drying methods, as well as chemical vapor deposition (CVD) methods. The CVD method of materials synthesis consists of reacting the constituents of a vapor phase on the surface of a heated solid. As a result of this reaction (or decomposition), a deposit of the reaction product is formed on the solid support surface. Thin nickel metal deposits on powdered alpha-alumina, silica, zirconia, and zirconium metal have been prepared by the thermal decomposition of Ni(CO)$_4$ as it passed through a fluidized bed of the substrate powder heated to 150° C. to 200° C.

Selected arc melted, unsupported alloys have been tested for their catalytic hydrogenation activity, using the hydrogenation of ethylene to ethane model reaction, as a function of catalyst bed temperature, reactant concentrations, and catalyst pretreatment conditions. Unsupported nickel (as well as Ni supported on silica and alumina) is known to be easily poisoned by low amounts of sulfur. Each sample button was flipped and remelted six times to help ensure sample homogeneity. The arc melted buttons then either were sliced and polished for use in the characterization studies or powdered and sieved (−200, +325 mesh) and used in the catalyst testing studies. Pure Pt and Ni powders or foils were used as reference materials. The following schematic shows the catalyst preparation procedure for the hydrogenation of ethylene;

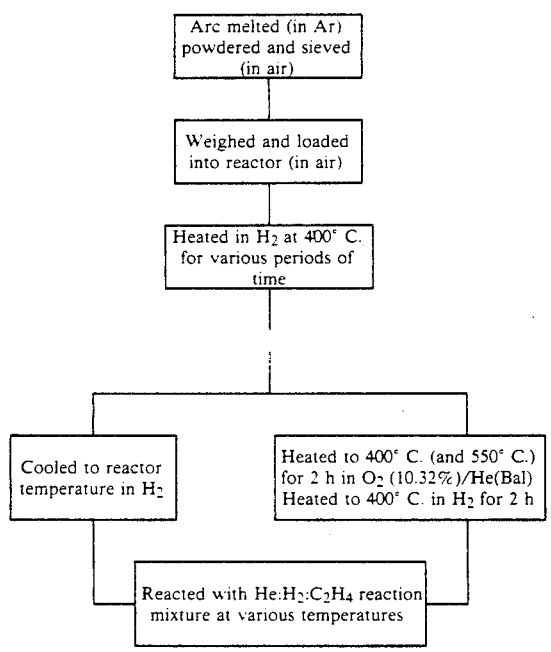

CATALYTIC ACTIVITY TESTING AND SULFUR POISONING/REGENERATION STUDIES

The catalytic hydrogenation activities were determined using the conversion reaction of ethylene, $C_2H_4$, to ethane, $C_2H_6$.

Figure 2:
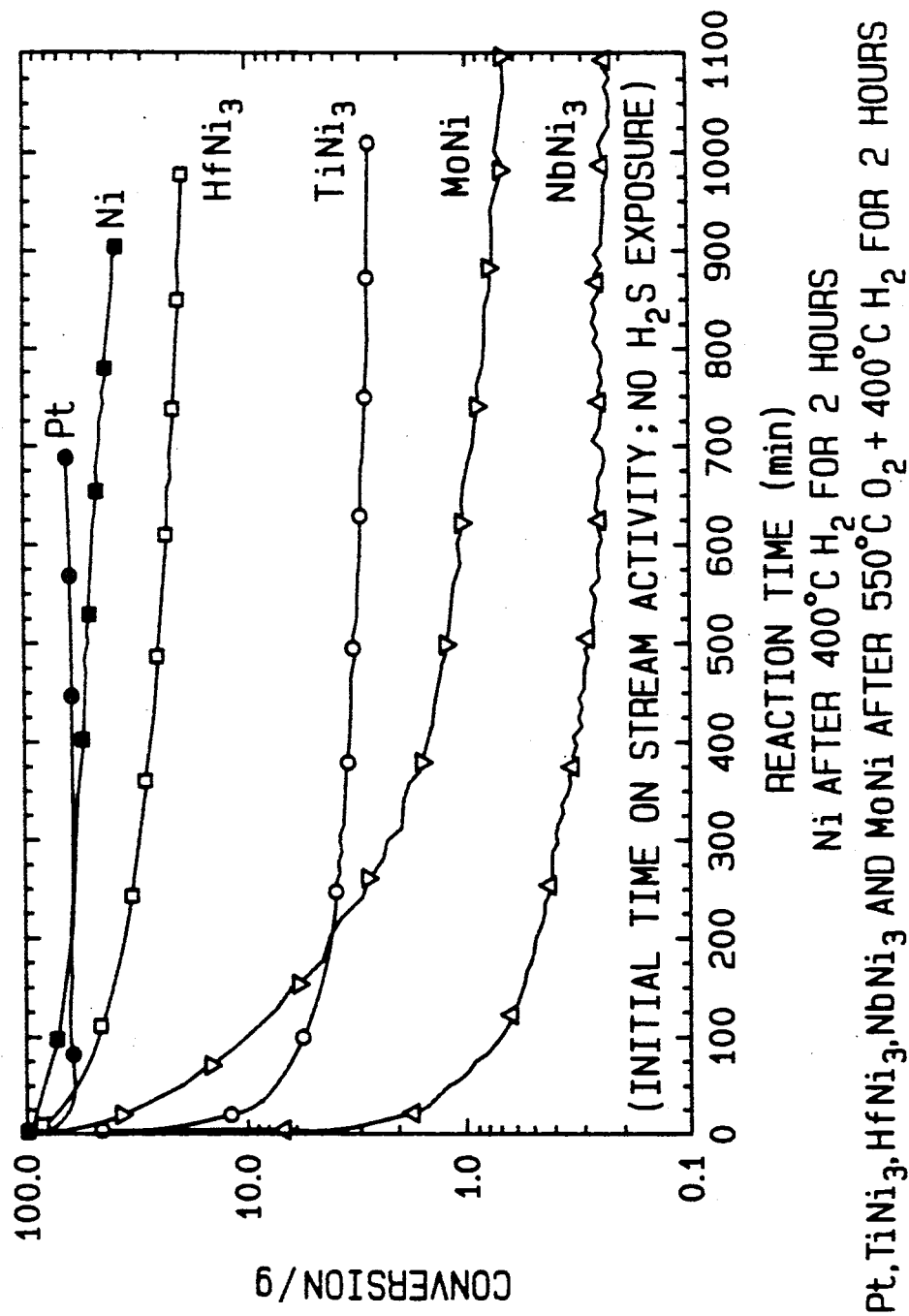
FIG. 2 is a graph similar to FIG. 1 showing catalytic hydrogenation activity at 90° C. as a function of reaction time for $HfNi_3$, $TiNi_3$, $MoNi$ and $NbNi_3$.
Figure 3:
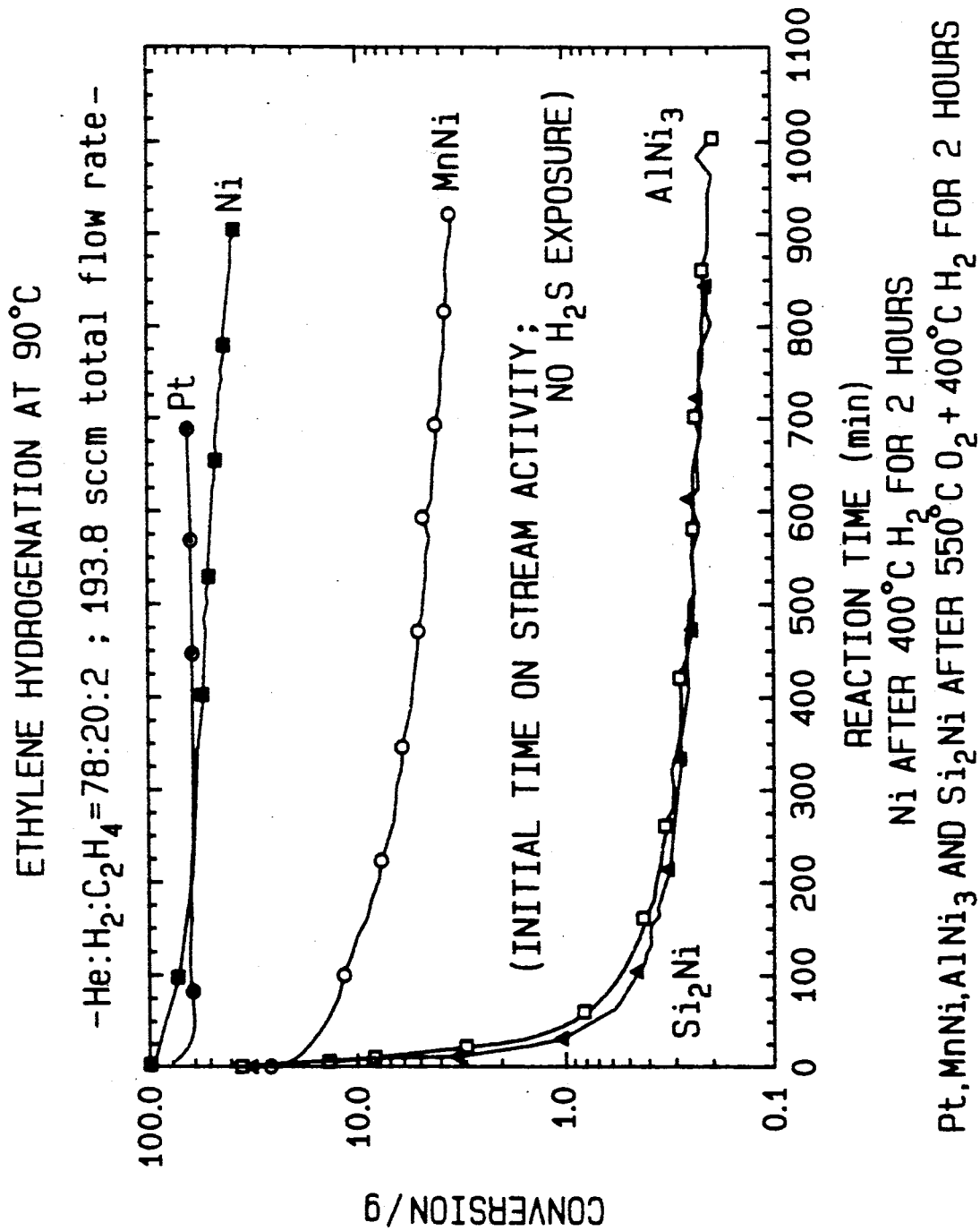
FIG. 3 is a graph similar to FIG. 1 showing catalytic hydrogenation activity at 90° C. as a function of reaction time for $MnNi$, $AlNi_3$ and $Si_2Ni$.
Figure 4:
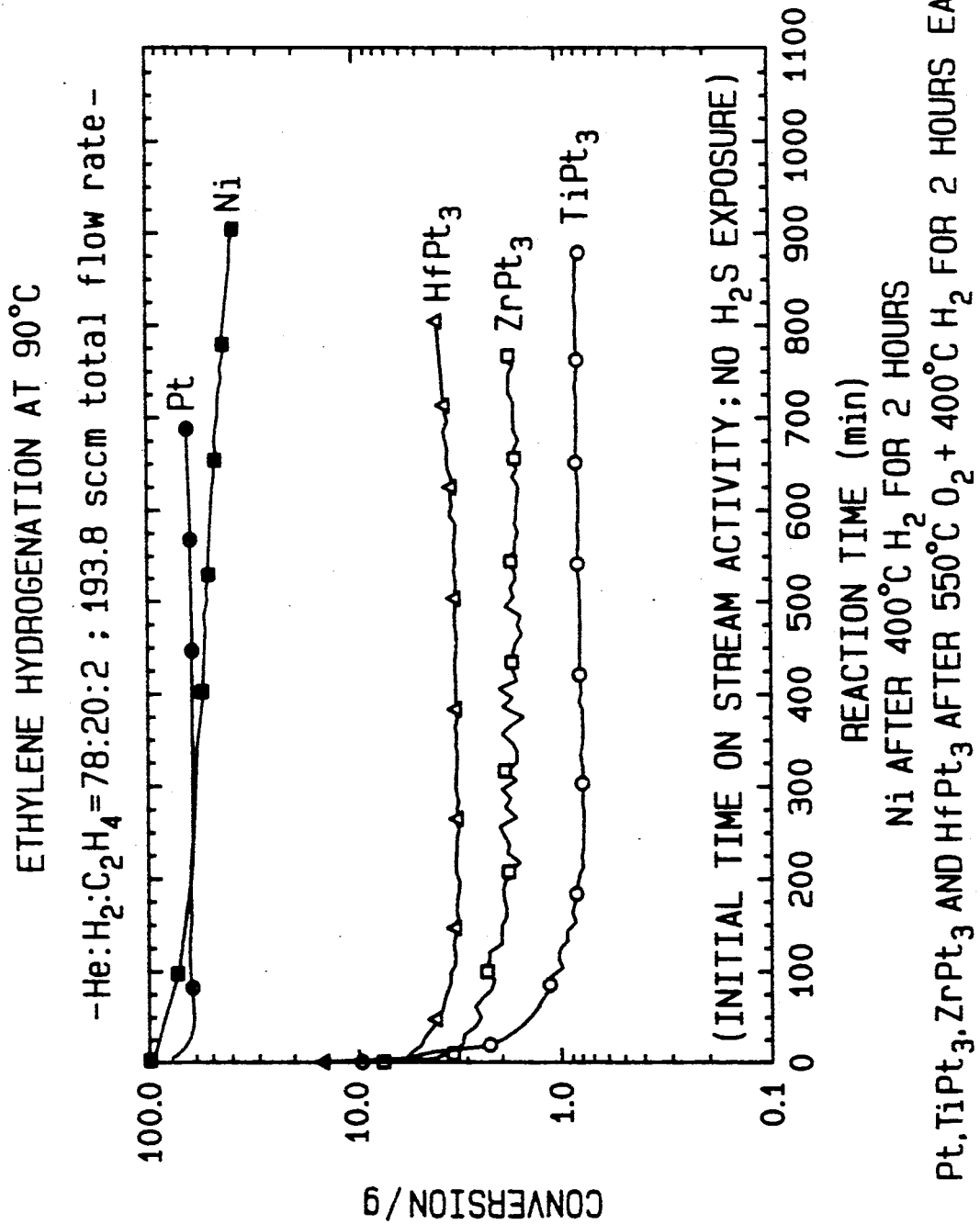
FIG. 4 is a graph similar to FIG. 1 showing catalytic hydrogenation activity at 90° C. as a function of reaction time for $TiPt_3$, $ZrPt_3$ and $HfPt_3$.

FIG. 1 shows the initial Conversion/g data (defined as the fraction of ethylene converted to ethane divided by the weight of catalyst used in the reactor) as a function of reaction time. As shown in FIG. 1, the long-term stability of the Zr/Ni compounds is better than pure Ni and ZrNi$_5$ and ZrNi$_7$ are more stable than pure Pt. Shown in FIGS. 2 and 3 are similar data comparing the activities of the pure Pt and Ni to the other compounds studied. None of these compounds had an activity stability as good as the Zr/Ni compounds, pure Pt, or pure Ni. A relative ordering for the time-on-stream activity is: ZrNi$_5$ > Zr$_2$Ni$_7$ > Pt > Zr$_2$Ni > Ni > HfNi$_3$ > TiNi$_3$ > MnNi > MoNi > NbNi$_3$ ≈ AlNi$_3$ ≈ Si$_2$Ni. Similarly, data for the three platinum-containing intermetallic alloys studied (TiPt$_3$, ZrPt$_3$, and HfPt$_3$) are shown in FIG. 4. It was found that periods longer than 2 hours for a 550° C. O$_2$ treatment resulted in substantial increases in the activity for the three platinum intermetallic alloys, as discussed below.

The sulfur poisoning/regeneration studies of the different materials concentrated on determining the rate at which the hydrogenation activity would decrease upon exposure to successive amounts of H$_2$S gas during the hydrogenation of ethylene to ethane. The experimental procedure used 10 powdered catalyst (−200, +325 mesh) mixed with 50 mg of powdered, low surface area alpha-alumina (−200, +325 mesh), which served as an inert filler. Before testing, the catalyst was weighed and loaded into a tubular reactor where it was activated using various treatments as listed in the figures. The catalyst then was heated to 90° C. (or 200° C. for some data in FIGS. 16-19) in flowing hydrogen until the temperature stabilized, at which point the reaction mixture, consisting of He: H$_2$: C$_2$H$_4$, in a mole ratio of 78:20:2, at a total flow rate of 250 ccm [193.8 sccm, i.e., the equivalent flow rate at 1 atm pressure and 273° K (0° C.)] was passed over the catalyst. The catalyst activity then was allowed to stabilize, generally 1000 min., before the first exposure to H$_2$S gas. Activity was measured using a calibrated gas chromatograph.

In the figures, the Conversion/g values are plotted as a function of reaction time (minutes) or as a function of the total exposure to H$_2$S gas (given in terms of moles H$_2$S/g of catalyst). The multiple data sets shown in each figure are for the specified material and after the specific treatment listed in the figure. The activity, i.e., Conversion/g, is for a 90° C. reaction temperature unless otherwise noted. Each data set in a given figure is also labeled by (1), (2), (3), and the like, which is used to convey the order in the testing sequence that the data set was acquired. The Conversion/g versus Reaction Time and the Conversion/g versus H$_2$S exposure data sets for a given material are sequential in that, for example, the material was activated by a specific treatment. The material was then allowed to catalyze the reactants, and the Conversion/g was followed as a function of time. Following this, the material was exposed to various amounts of H$_2$S. The material then was given a reactivation treatment, and the catalytic activity was followed again as a function of reaction time, followed by exposure to H$_2$S gas. The procedure was repeated until a given sequence of studies had been made.

Each H$_2$S exposure cycle is labeled H$_2$S#1, H$_2$S#2, and the like, to differentiate the relative ordering of that data set in the overall study of the material. The H$_2$S poisoning studies were conducted using either a 0.1 cm$^3$ or a 1.0 cm$^3$ gas-tight syringe to inject various volumes of a b 1.02% H$_2$S/98.98% He standard gas mixture through a rubber septum (upstream of the catalyst bed) directly into the He/H$_2$/C$_2$H$_4$ reactant stream. The catalyst bed temperature was maintained at 90° C. (or 200° C.) at all times. Since it took five minutes for the sample to elute from the gas chromatograph, the time interval between successive H$_2$S volumes was approximately 8 minutes.

Figure 5:
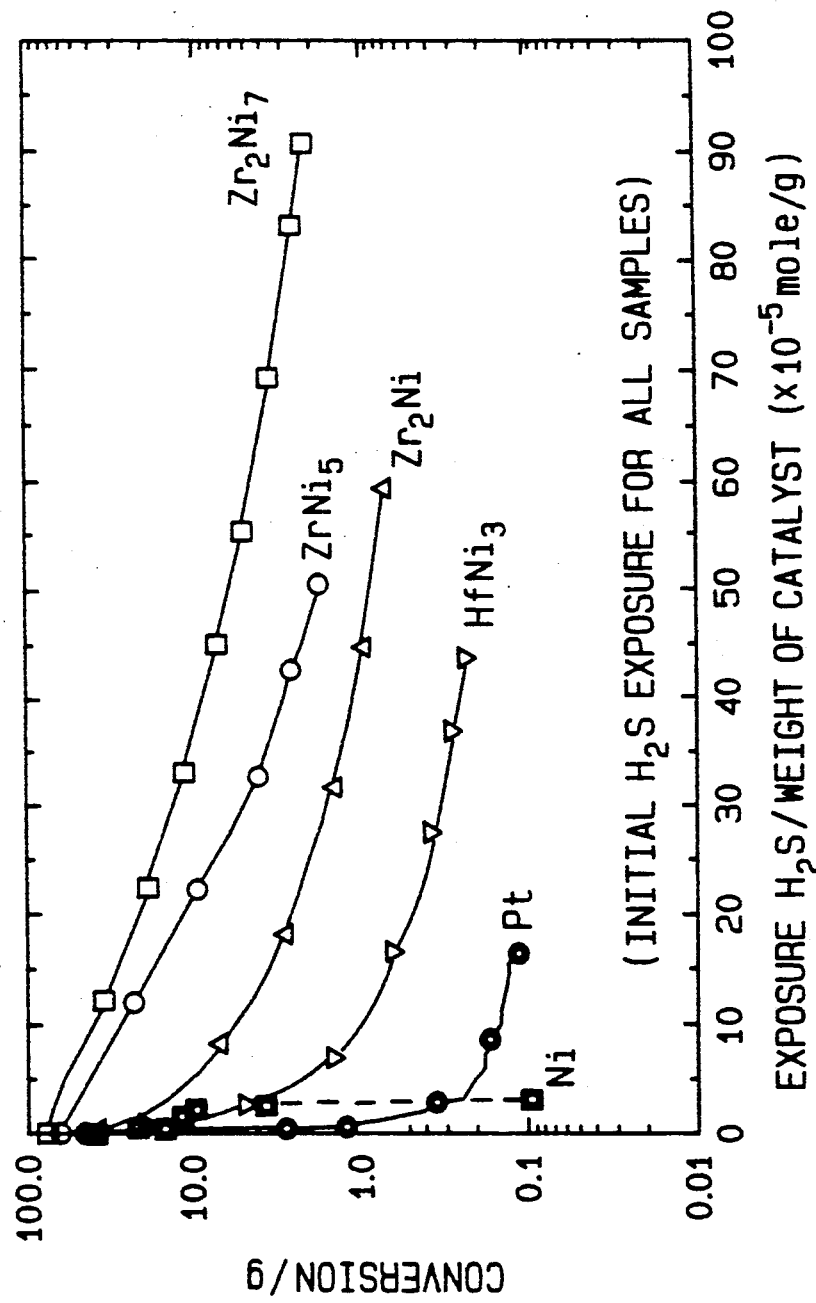
FIG. 5 is a graph showing the catalytic hydrogenation activity at 90° C. as a function of initial exposure to $H_2S$ gas; Ni after 400° C. $H_2$ for 2 hours; Pt, $ZrNi_5$, $Zr_2Ni_7$, $Zr_2Ni$, and $HfNi_3$ after 550° C. $O_2 + 400°$ C. $H_2$ for 2 hours each.
Figure 6:
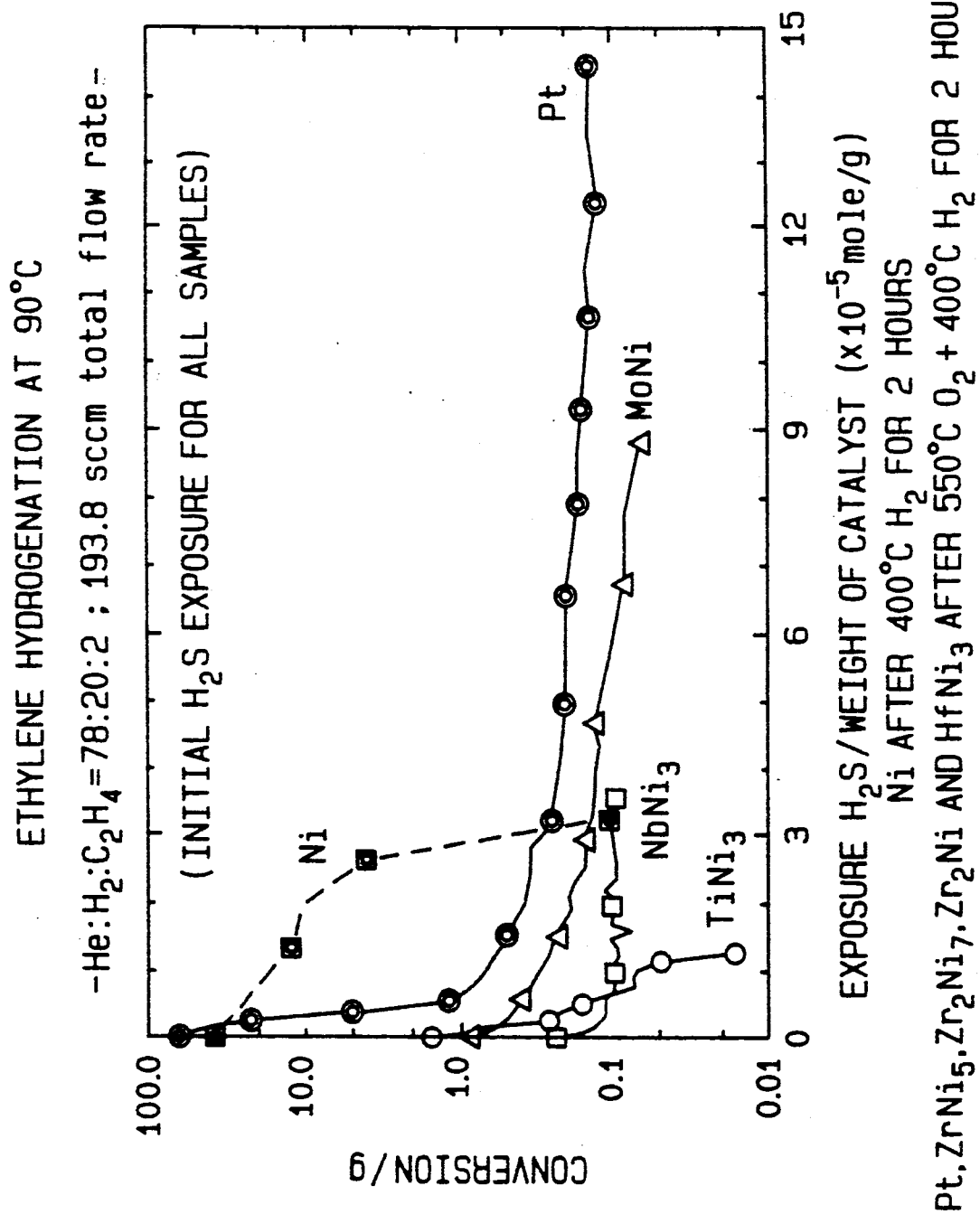
FIG. 6 is a graph similar to FIG. 1 showing the catalytic hydrogenation activity at 90° C. as a function of reaction time for $TiNi_3$, $NbNi_3$ and $MoNi$.
Figure 7:
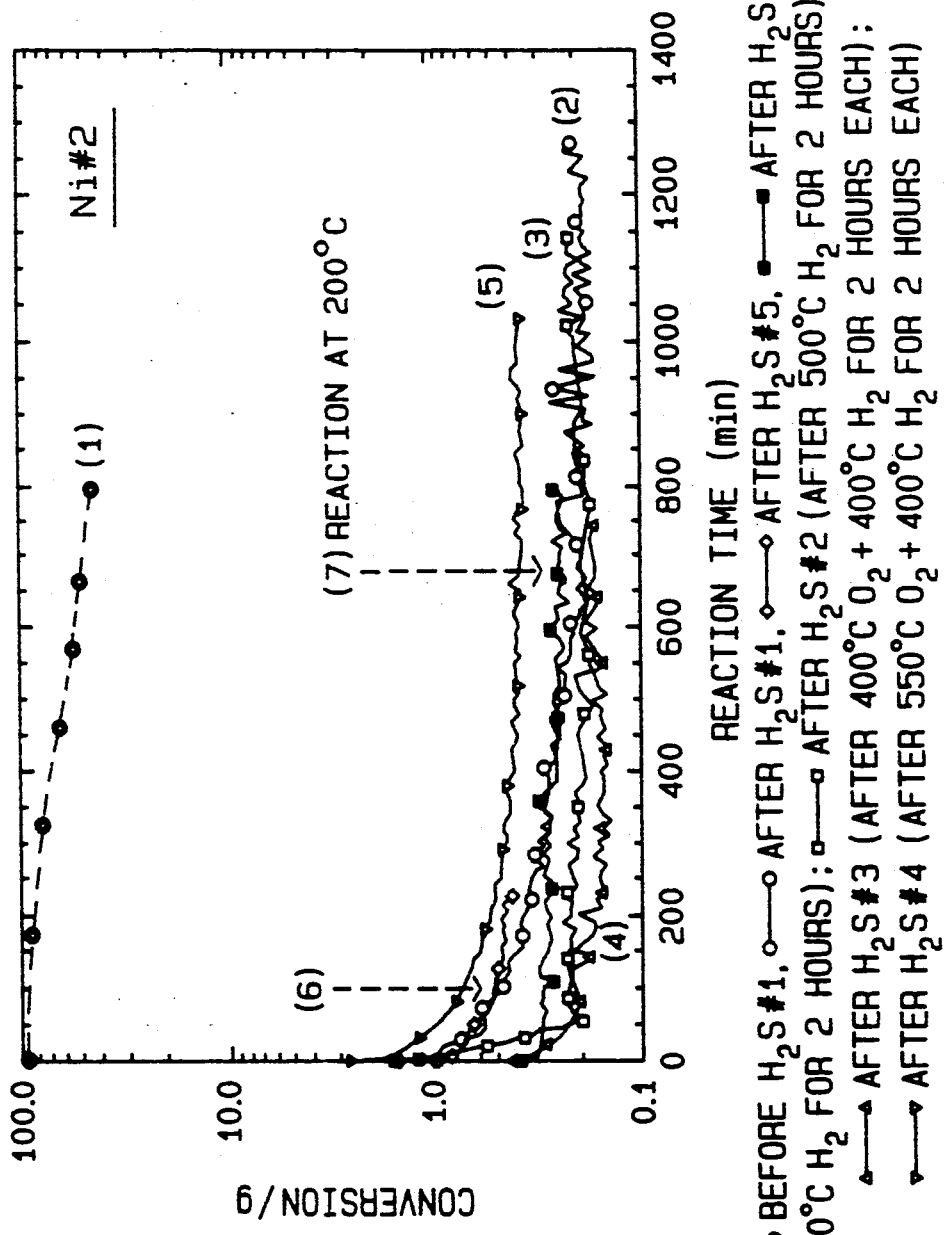
FIG. 7 is a graph showing the catalytic hydrogenation activity at 90° C. as a function of reaction time and exposure to $H_2S$ for pure Ni as a function of different $H_2S$ exposures and regeneration treatments as given in the figure.
Figure 8:
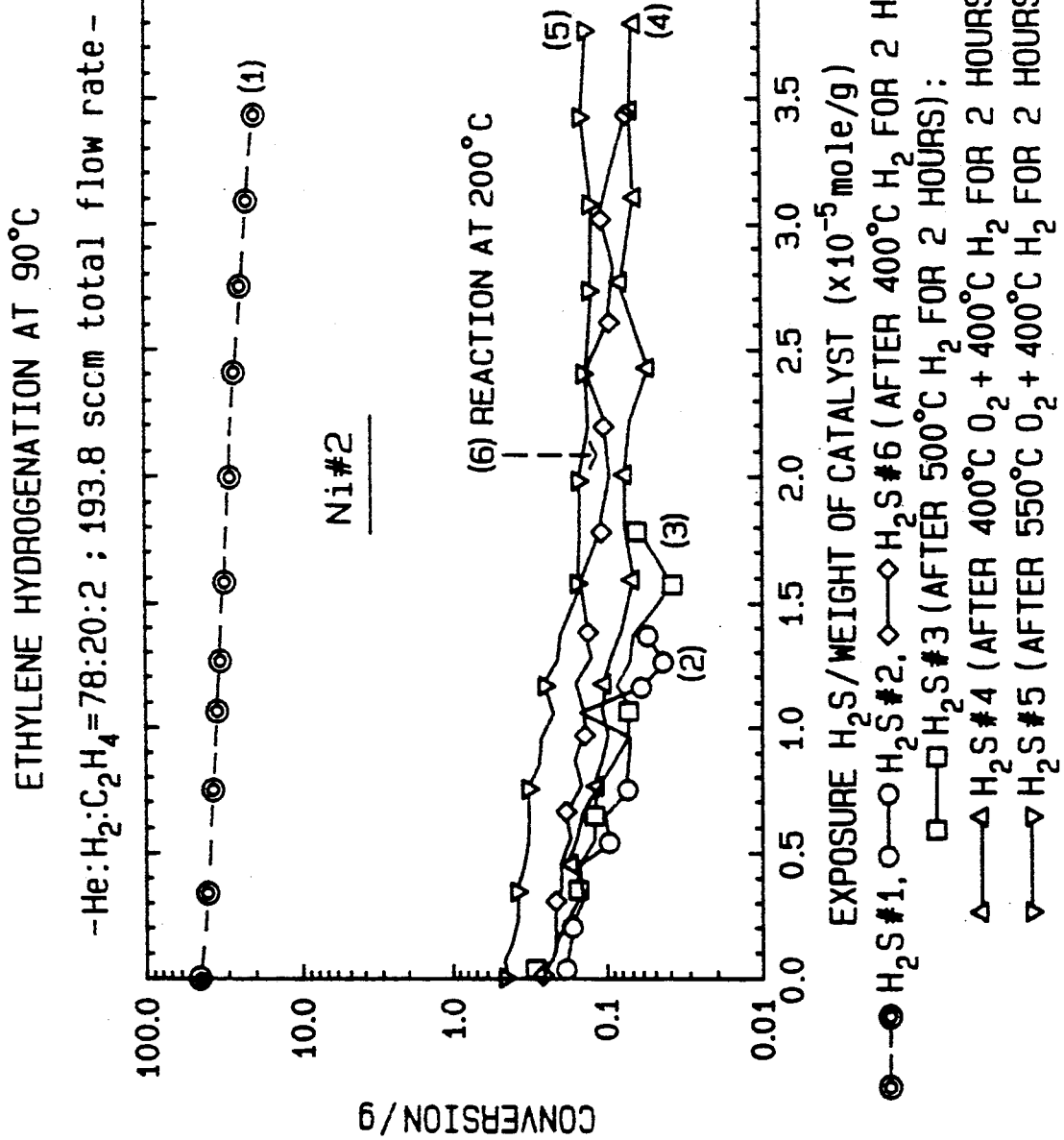
FIG. 8 is a graph similar to FIG. 7 showing the catalytic hydrogenation activity at 90° C. as a function of reaction time and exposure to $H_2S$ for pure Ni with different treatments.

Shown in FIGS. 5 and 6 are initial H$_2$S exposure activity data for a number of the materials studied (note the difference in the X-axis scales between these figures). These two figures illustrate the conclusion that the Zr/Ni and Hf/Ni compounds are less susceptible to sulfur poisoning than either pure Ni or pure Pt. The other nickel-containing compounds are not as good, but some of them (MoNi and $NbNi_3$) show some improvement over pure Ni.

To illustrate the effects of various reactivation treatments on the activity of the pure metals and the intermetallic alloys, FIGS. 7 to 14 show the results for the activity versus reaction time, and the activity versus $H_2S$ exposure for pure Ni (sample #2), $ZrNi_5$ (sample #2) and $Zr_2Ni_7$ (sample #5). The data for pure Ni (FIGS. 7 and 8) illustrates the observation that none of the regeneration treatments tried were able to successfully restore the initial activity to more than 2% of its original value. A three-step treatment also was tried for pure Ni (400° C. $H_2$/CO in a molar ratio of 3; followed by treatment at 550° C. with 1% $O_2$/99% He followed by treatment with 400° C. $H_2$ for 1 hour each; compared to the two-step process of treatment at 550° C. with 1% $O_2$/99% He; followed by treatment with 400° C. $H_2$ for 1 hour). The two-step treatment of pure Ni appeared to give the best results.

Figure 9:
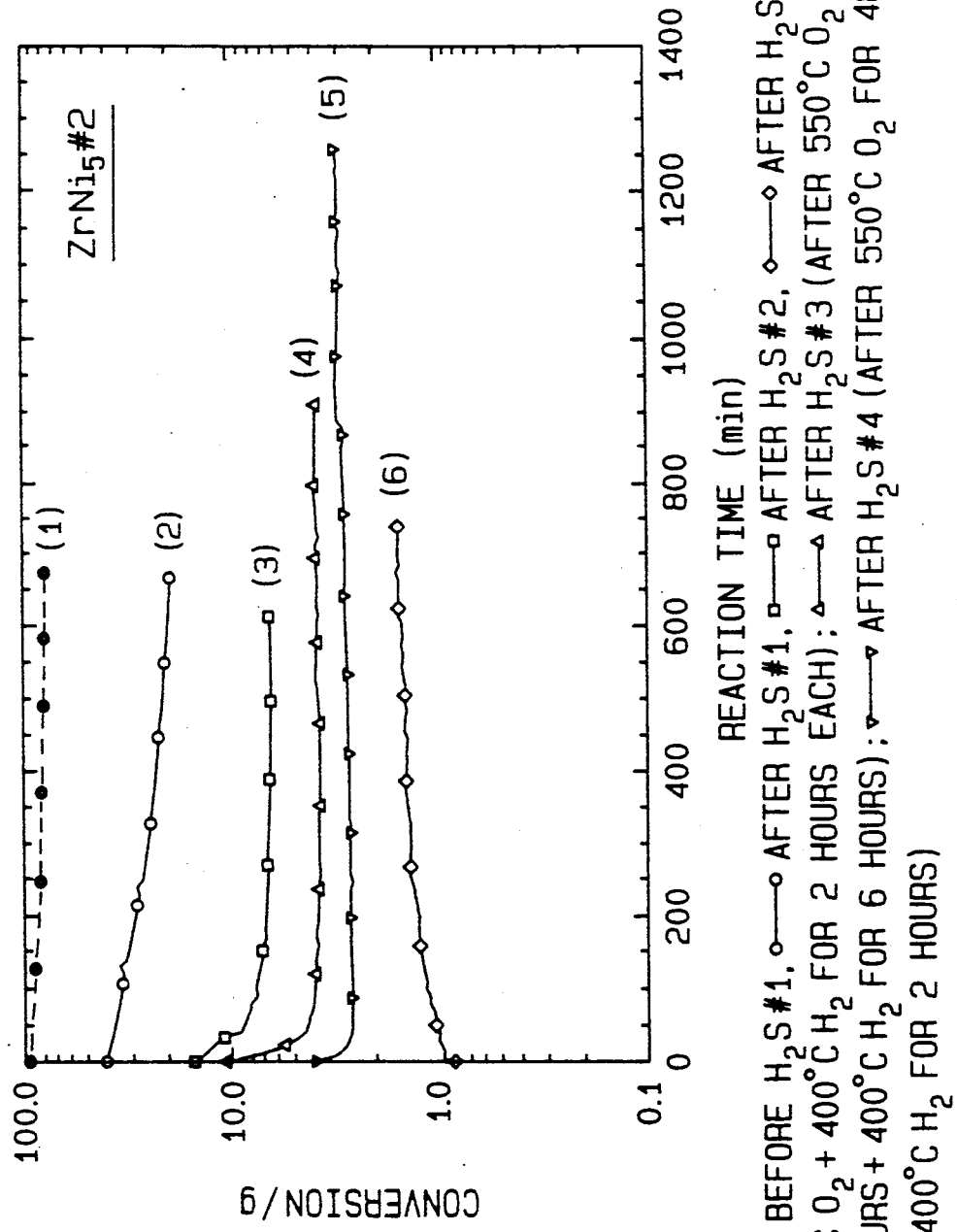
FIG. 9 is a graph similar to FIG. 7 showing catalytic hydrogenation activity at 90° C. versus reaction time for $ZrNi_5$, (sample #2) as a function of $H_2S$ exposure and regeneration treatments as given in the figure.

Shown in FIG. 9 is the Conversion/g hydrogenation activity versus Reaction Time data for the $ZrNi_5$ #2 sample after six treatment cycles (after the initial activation step and after five $H_2S$ poisoning steps). The 2 hours versus 48 hours $O_2$ treatment and 2 hours versus 6 hours $H_2$ treatment did not appear to influence the results dramatically. The overall effect of these successive poisoning/regeneration cycles was to reduce the hydrogenation activity of the catalyst, as has been observed in our past studies. However, the $ZrNi_5$ could be sulfur poisoned and then regenerated to a level 10 to 15 times higher than an equal weight of pure Ni.

Figure 10:
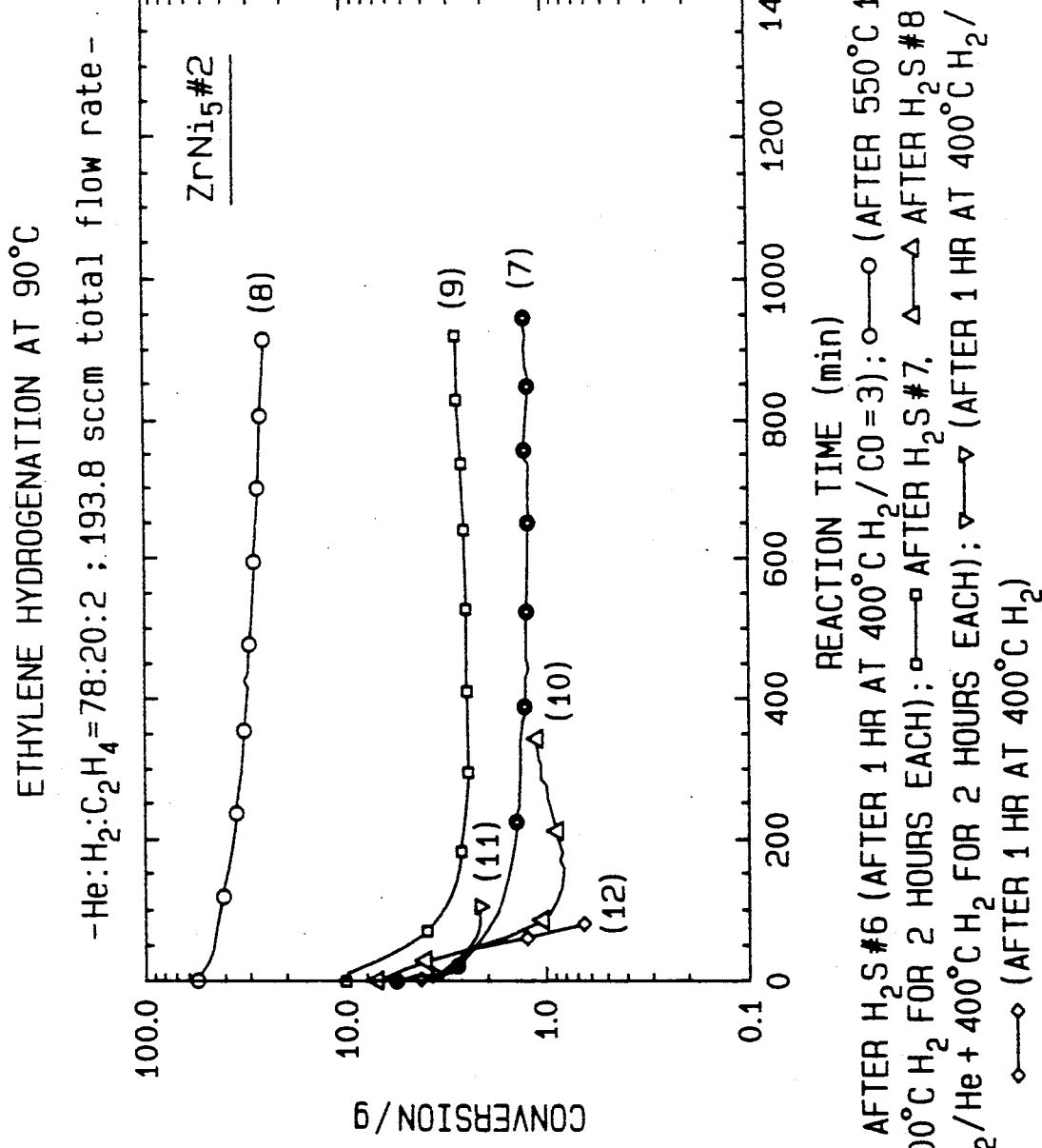
FIG. 10 is a graph similar to FIG. 7 for $ZrNi_5$ (sample #2) for indicated regeneration treatments.

In FIG. 10 are shown six additional data sets for further $H_2S$ poisoning and regeneration treatments. Data set (7) followed poisoning $H_2S$#6 and used a 400° C., 1 hour treatment with $H_2$/CO gas mixture at a mole ratio of 3 at a 200 ccm flow rate. The resulting activity was comparable to the activity shown in data sets (5) and (6) in FIG. 9. The catalyst then was treated using 1% $O_2$/ 99% He for 2 hours at 550° C. followed by a 2 hour 400° C. $H_2$ treatment. The activity was dramatically improved as shown by data set (8). The catalyst then was poisoned with $H_2S$ twice ($H_2S$#7 and $H_2S$#8), each time being followed by a 550° C. 1% $O_2$/99% He treatment; and a subsequent treatment with 400° C. $H_2$, for 2 hours each treatment. The restored catalytic activity was not as good as that shown by data set (8) following the same regeneration treatment. The catalyst then was treated for 1 hour at 400° C. using the $H_2$/CO gas mixture at a molar ratio of 3 [data set (11)]and using a 400° C. $H_2$ treatment [data set (12)]. Data set (12) shows that a 400° C. $H_2$ treatment is not very successful at restoring the activity of the self-poisoned catalyst. It appears that during the hydrogenation reaction "carbonaceous" residues build up on the catalyst causing a steady decline in its activity.

Figure 11:
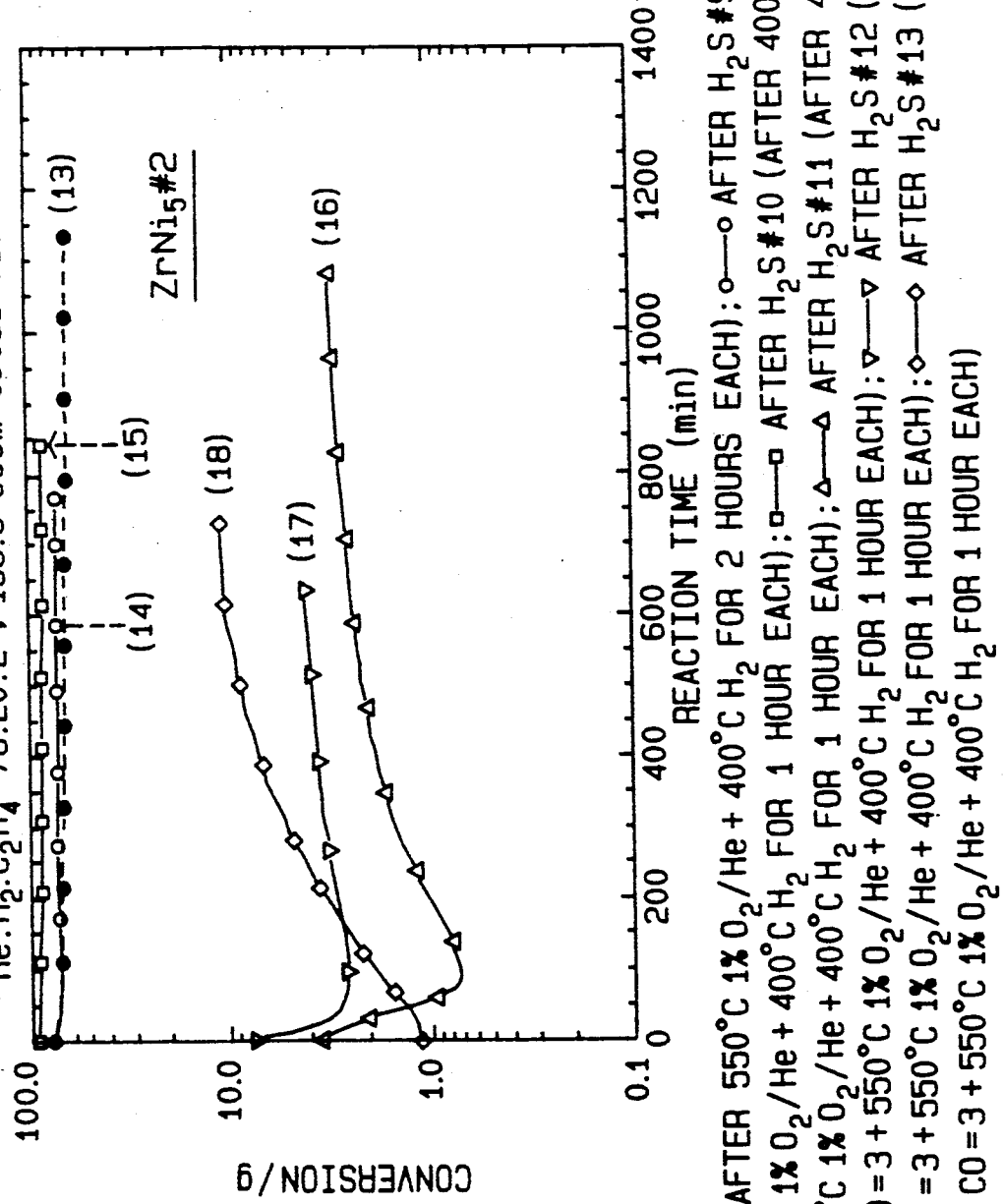
FIG. 11 is a graph showing catalytic hydrogenation activity versus exposure to $H_2S$ at 90° C. for $ZrNi_5$ (sample #2) as a function of exposure and regeneration treatments as given in the figure.

In FIG. 11 are shown six more data sets from the same $ZrNi_5$ #2 sample. Data set (13) follows a 550° C. 1% $O_2$/ 99% He treatment; followed by treatment with 400° C. $H_2$, 2 hour treatments, resulting in an activity level of 075% of the initial unpoisoned catalyst. The sample then was poisoned again ($H_2S$#9) followed by the three-step treatment described earlier. Data set (14) shows that this treatment restores the hydrogenation activity of the $ZrNi_5$ sample to a level comparable to that observed for the initial unpoisoned state. After the $H_2S$#10 poisoning, the catalyst was similarly regenerated with the three-step treatment sequence. The difference in this treatment was that the catalyst was not heated and cooled in the $H_2$/CO gas mixture having a molar ratio of 3, but once the temperature had reached 400° C. in flowing He, the $H_2$/CO mixture then was used for 1 hour followed by cooling the sample in flowing He. The reason for this procedure was determine if $Ni(CO)_4$ was being formed at ≃50° C. to 100° C. by the CO and being redeposited in the catalyst bed as pure Ni. The activity of the $ZrNi_5$ after this treatment was actually greater [data set (15)]than that of the initial unpoisoned sample. Data sets (16) and (17) followed poisonings $H_2S$ #11 and $H_2S$ #12, respectively, and resulted from treatments that replaced the $H_2$ and CO by He in the first step of the three-step regeneration treatment. The activity levels achieved are much worse than when an $H_2$/CO mixture is used and the data show a very unusual temporal dependence of the activity (i.e., a rapid decline in activity followed by a gradual increase at later reaction times). Following poisoning by $H_2S$ #13 data set (18)], the original three-step treatment with the gas mixture of $H_2$/CO at a molar ratio of 3 was used, but the same unusual temporal dependence was observed and the constant activity level was 10% of that observed following data set (15).

It is thought that the reason for this low activity level following these last three poisoning/regeneration cycles is the high levels of carbon that were deposited by the He/CO treatment used before data set (16). The CO probably underwent a Boudouard reaction (2 CO=C+$CO_2$), which formed a heavy coating of carbon on the catalyst that was not successfully removed by the subsequent $O_2$/$H_2$ treatments.

Figure 12:
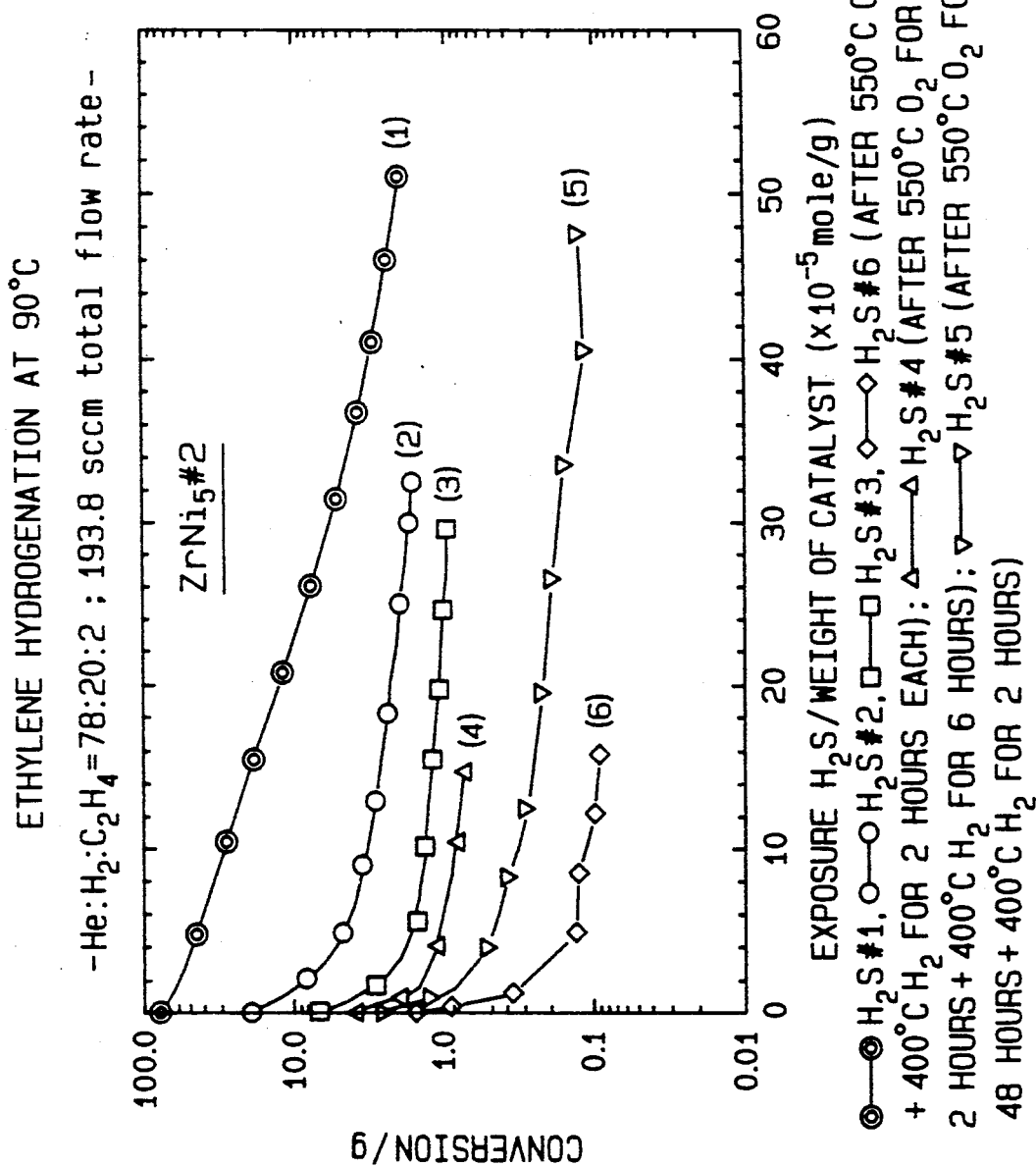
FIG. 12 is a graph showing catalytic hydrogenation activity versus exposure to $H_2S$ at 90° C. for $ZrNi_5$ (sample #2) as a function of exposure and regeneration treatments as given in the figure.
Figure 13:
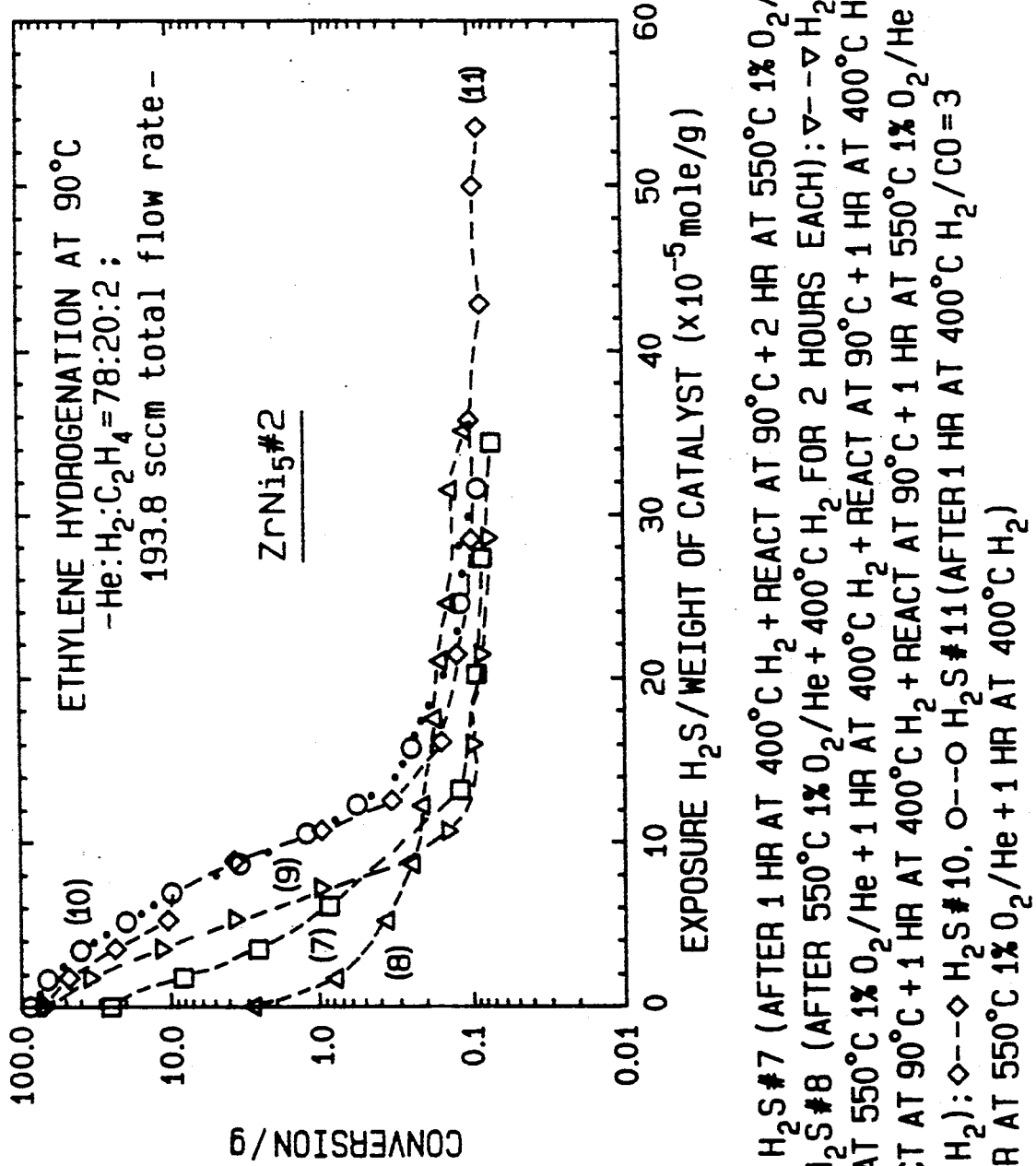
FIG. 13 is a graph showing catalytic hydrogenation activity versus exposure to $H_2S$ at 90° C. for $ZrNi_5$ (sample #2) as a function of exposure and regeneration treatments as given in the figure.

Shown in FIGS. 12 and 13 are the Conversion/g hydrogenation activities as a function of exposure to $H_2S$ (given as moles $H_2S$/g of catalyst) for the various poisoning/regeneration cycles. A general observation regarding these data sets is that there appear to be two regions of poisoning rates: a rapid exponential decline in activity at low total exposure followed by a slower exponential decline in activity at high total $H_2S$ exposures. It would thus appear that two active catalytic "sites" exist on the catalyst: one that is very active but poisons quite rapidly and one which is less active but poisons much more slowly. The exact nature of these "sites" is as yet unknown.

Figure 14:
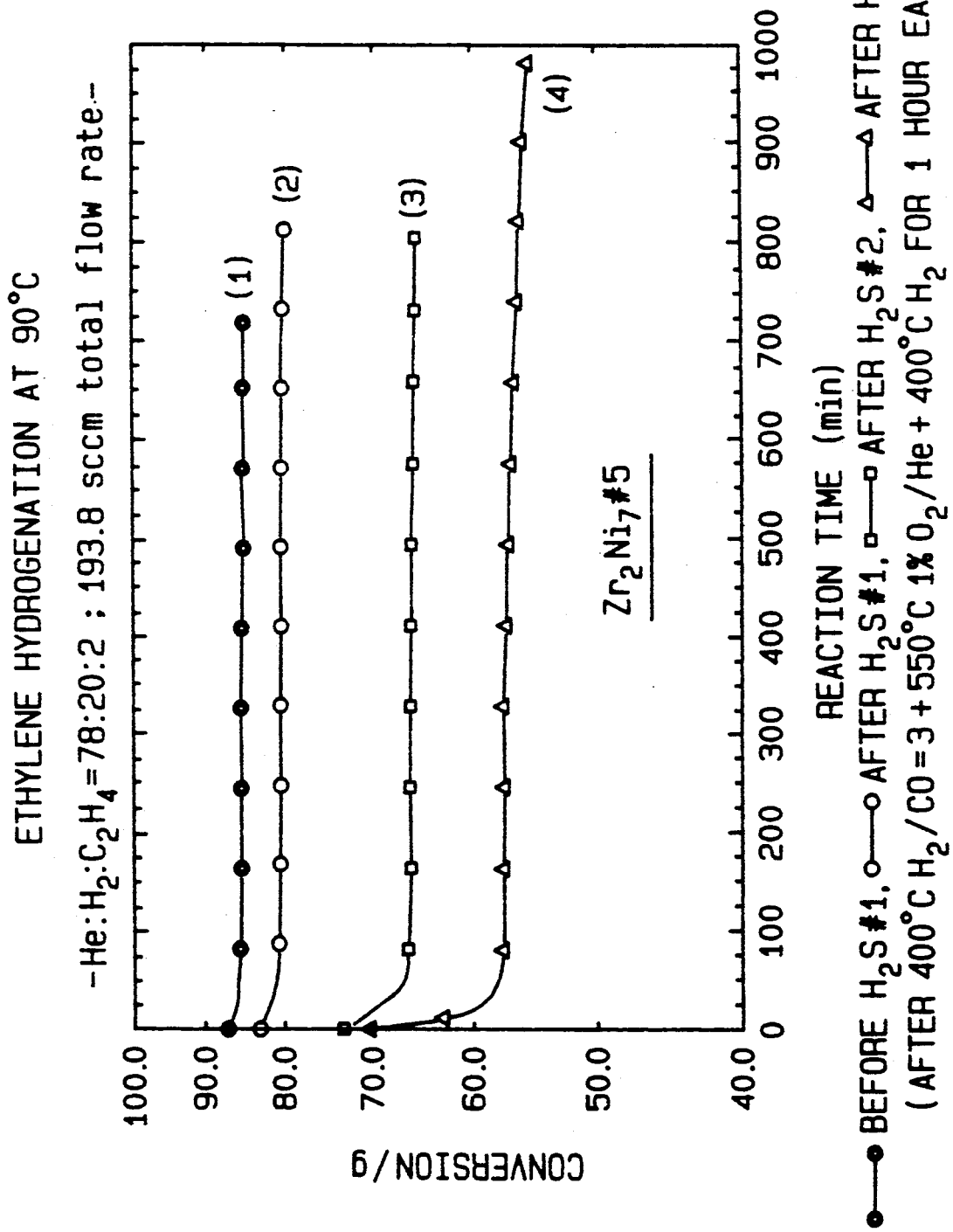
FIG. 14 is a graph showing catalytic hydrogenation activity at 90° C. versus reaction time for $Zr_2Ni_7$ (sample #5) before $H_2S$ exposure three $H_2S$ exposure/regeneration treatments for the regeneration treatment given in the figure.
Figure 15:
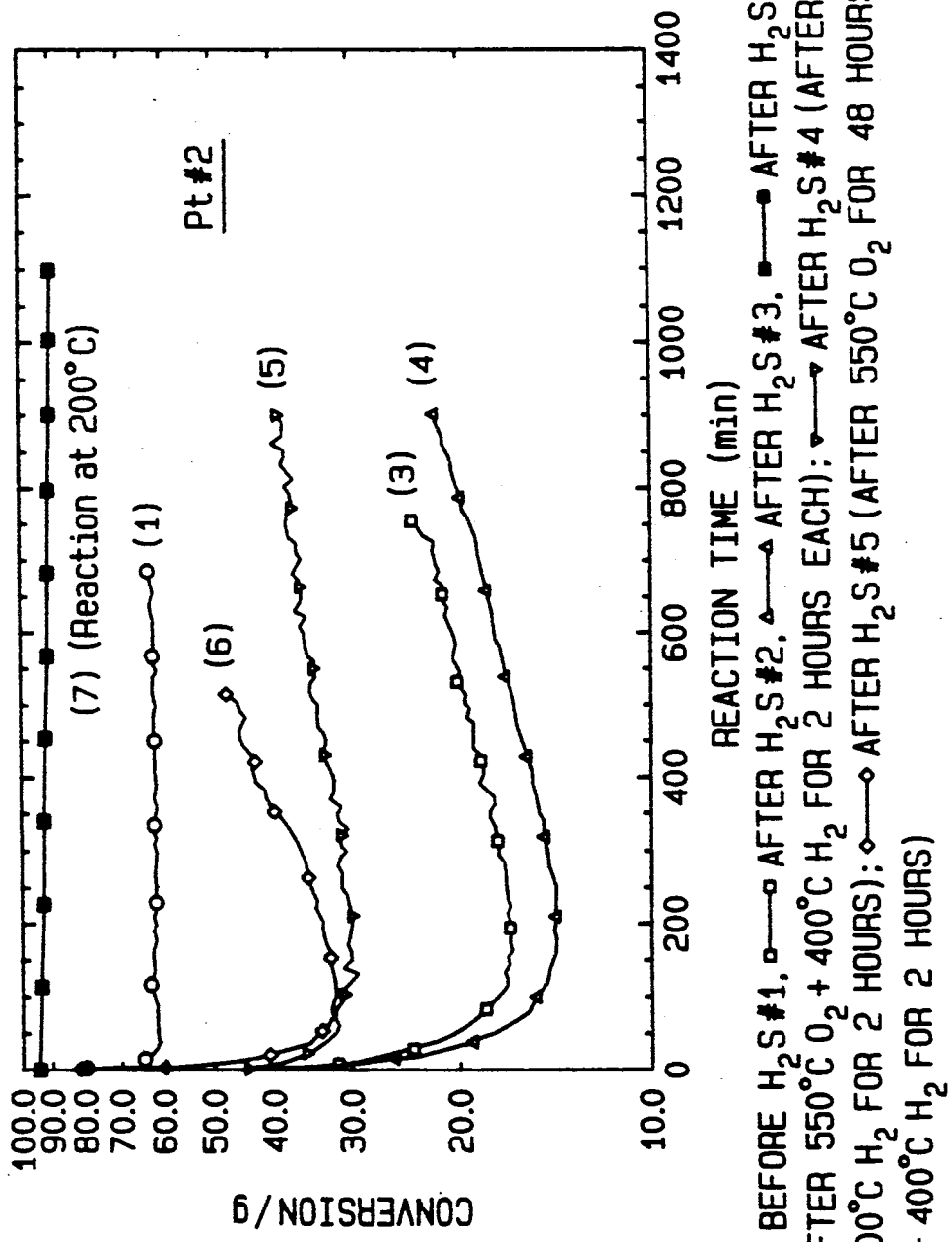
FIGS. 15 and 16 are graphs showing catalytic hydrogenation activity as a function of $H_2S$ exposure/regeneration treatment for pure Pt as given in the figure.
Figure 16:
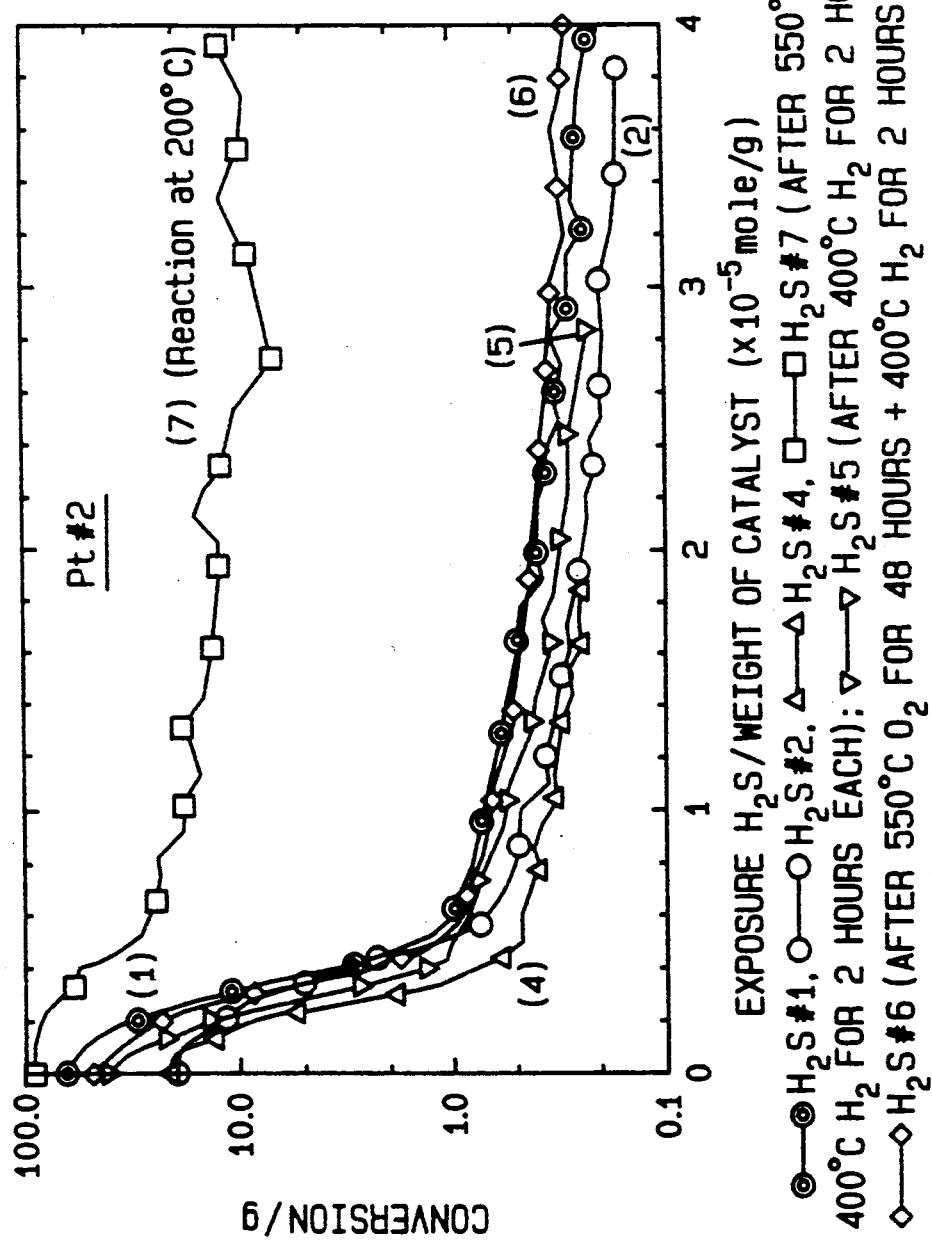

In order to verify that the three-step reduction/oxidation/reduction regeneration treatment was the most effective of those tried for hydrogenation catalysts, and to determine if the three-step treatment could be used to initially activate a catalyst, a $Zr_2Ni_7$ sample (sample #5) was studied. The results of these tests are shown in FIGS. 14 and 15. Shown in FIG. 14 are the Conversion/g versus Reaction Time for this compound before $H_2S$ exposure [data set (1)]and after three exposures to $H_2S$ [data sets (2), (3), and (4)]. A treatment with a 400° C. $H_2$/CO gas mixture at a mole ratio of 3, followed by treatment at 550° with 1% $O_2$/99% He, and 400° C. $H_2$or 1 hour, each treatment, sequence was used to initially activate as well as regenerate the catalyst. Although the level to which the activity could be regenerated declined with each cycle, even after the third $H_2S$ poisoning, the activity was still 66% (at 700 min. reaction time) of its initial unpoisoned activity. A previous sample of $Zr_2Ni_7$ (sample #4) attained only 5% of its initial unpoisoned activity after three $H_2S$ poisonings when a two-step 550° C. $O_2$; and 400° C. for 2 hours each, activation/regeneration treatment was used. It was shown that the poisoning H$_2$S/g data) is quite similar for the first two poisonings [data sets (1) and (2)], but increases by the third poisoning. The three-step activation/regeneration treatment, therefore, appears to be a very effective process for reactivating the sulfur-poisoned intermetallic alloy catalysts.

A similar study was made with pure Pt and three platinum-containing intermetallic alloys, TiPt$_3$, ZrPt$_3$, and HfPt$_3$ (FIGS. 15-18). The data for pure Pt are presented in FIGS. 15 and 16; the data for ZrPt$_3$ (representative of the three compounds studied) are given in FIGS. 17 and 18.

Figure 17:
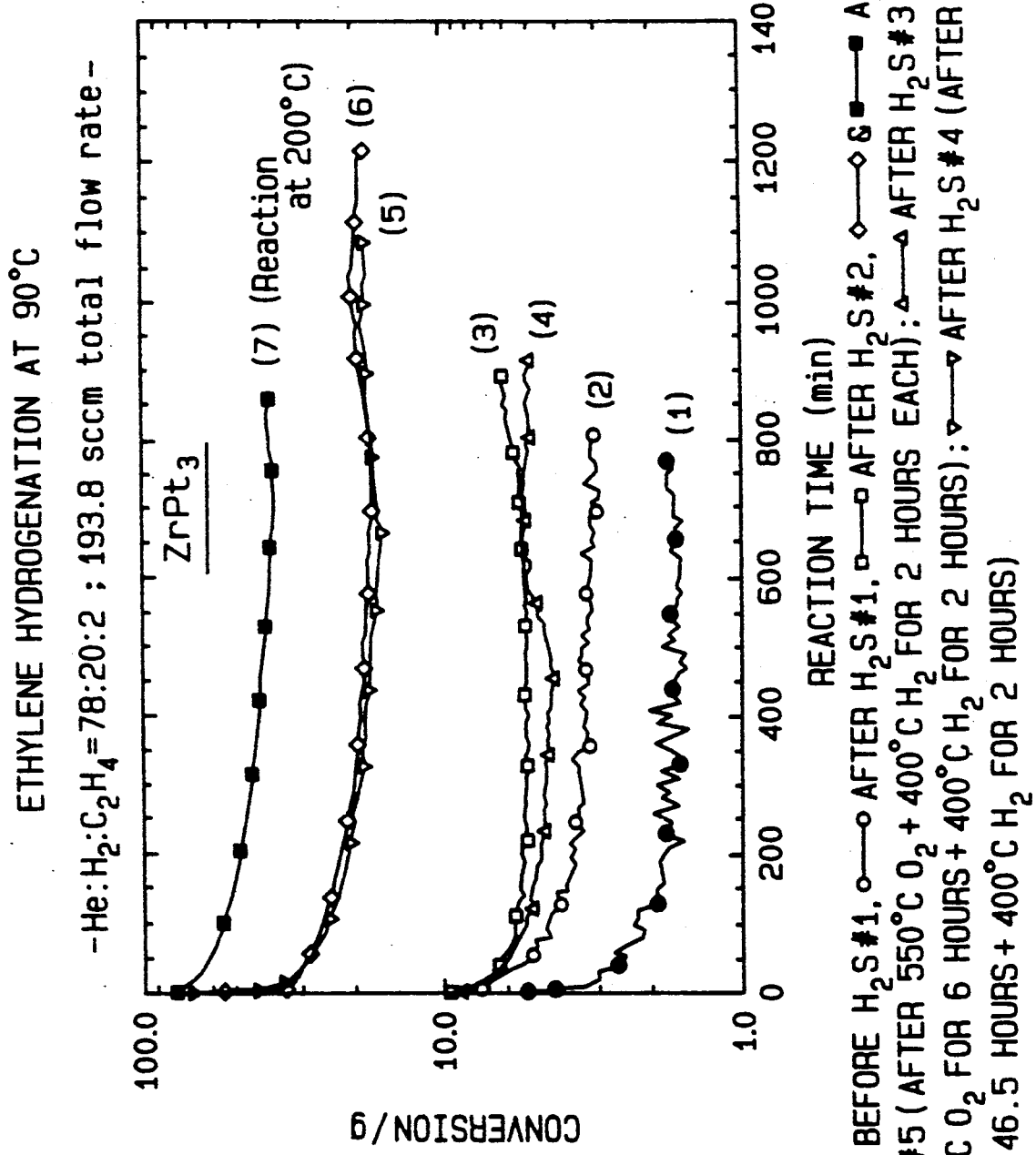
FIGS. 17 and 18 are figures similar to FIGS. 15 and 16 for $ZrPt_3$.
Figure 18:
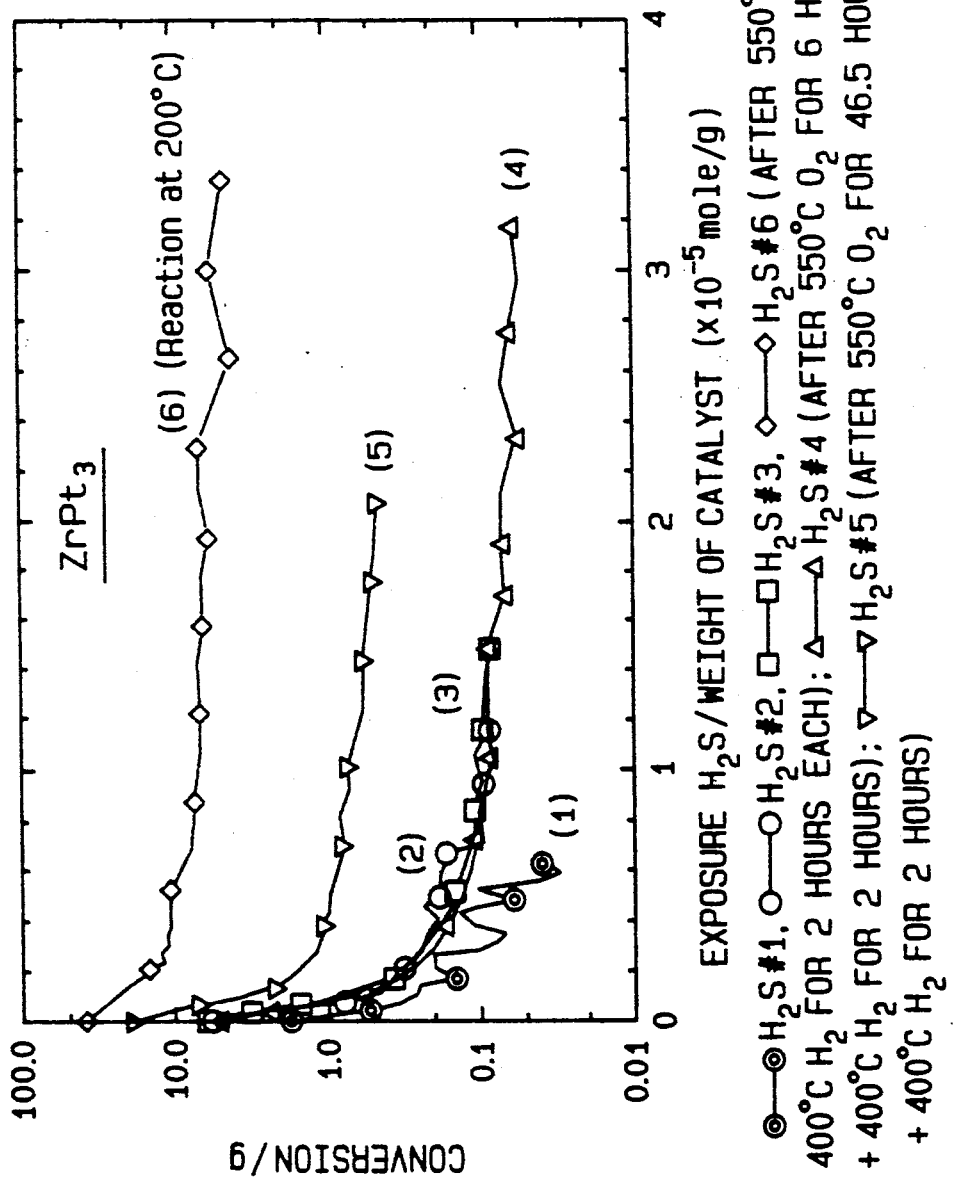

It can be seen by comparing data set (1) in FIGS. 15 and 17 that the catalytic activity decreases as a function of time until a relatively stable activity is reached. The relative activity levels are Pt > HfPt$_3$ > ZrPt$_3 \simeq$ TiPt$_3$. It was also observed that the activity decreases to a minimum and then begins to increase slowly. The decline in activity has been attributed to the formation of carbonaceous residues at the surface of the catalyst which block the active sites. After the materials had reached the activity level shown by the last data point of set (1) in FIGS. 15 and 17, they were then exposed to H$_2$S gas as described above. The results of the first poisoning tests are shown by curve (1) in FIGS. 16 and 18. All of the materials were observed to deactivate fairly rapidly upon H$_2$S exposure, and all appear to have several regions of exponential dependence (linear region in log plot), but different slopes as if several active sites were present with different deactivation rates. The pure Pt sample in data set (1), FIG. 16, appears to have three linear regions. All of the materials then were given a reactivation treatment, tested as a function of time, and subjected to an H$_2$S poisoning cycle, and the like, as discussed above. The ability to reactivate pure Pt is observed to decrease with treatment cycle, as shown by data sets (1), (3), and (4) in FIG. 15. Note, however, that a 400° C. H$_2$ treatment (i.e., no oxidation) is very effective at restoring the activity of the sulfur-poisoned Pt, as shown by data set (5) in 15. The 48 hour, 550° C. O$_2$ treatment, followed by a 2 hour 400° C. H$_2$ treatment (curve 6, FIG. 15) did not dramatically improve the regeneration level, as is the case for some of the Pt intermetallic alloys discussed below.

The ability to partially regenerate the ZrPt$_3$ catalyst is shown by the different data sets in FIG. 17. The level of regeneration appears to decrease with each successive cycle unless the duration of the oxygen treatment is increased. This is illustrated in curves (3), (4), (5) and (6) in FIG. 17. The ZrPt$_3$ activity increased after every reactivation and dramatically increased after the 46.5 hour O$_2$ treatment as shown in curves (4) and (5). This effect also was observed for TiPt$_3$ and HfPt$_3$ although it is not as great as for ZrPt$_3$. This observation probably indicates that Pt is diffusing to the catalyst surface, induced by the oxidation/reduction treatments. The amount of Pt arriving at the surface is controlled by the temperature and by the diffusion rate of the Pt through either the TiO$_2$, ZrO$_2$ or HfO$_2$ oxides that are formed. The maximum period used for the 550° C. oxidation has been 48 hours, with no definite indication that the catalytic activity would not increase with longer treatments.

The relative ordering of ethylene hydrogenation activities after successive H$_2$S poisonings for the platinum-containing intermetallic alloys studied is Pt > ZrPt$_3$ > HfPt$_3 \simeq$ TiPt$_3$ The three-step activation/regeneration treatment for the platinum-containing intermetallic alloys and the 1% O$_2$/99% He treatment, are expected to enhance the performance of the Pt-containing alloys as it does for the Ni-containing alloys.

The sulfur poisoning/regeneration studies indicated that the Zr/Ni compounds (in particular ZrNi$_5$ and ZrNi$_7$) as well as Hf/Ni and Nb/Ni compounds exhibit high hydrogenation activity, better activity maintenance, less susceptibility to poisoning by sulfur and regeneration of activity after poisoning by oxidation/reduction treatments.

CATALYST CHARACTERIZATION

The surface composition and physical morphology of the various intermetallic compounds were studied using Auger electron spectroscopy (AES) and x-ray photoelectron spectroscopy (XPS, also known as ESCA). Upon the above-described elevated temperature oxidation, all of the Ni-containing intermetallic alloy compounds chemically decomposed, although to varying degrees, into a mixed metal oxide system wherein NiO was formed at the outermost surface layers due to a preferential segregation of nickel to the sample surface. The segregation of the nickel to the surface only occurs, however, after a thick oxide film of the other metal composing the compound has developed, i.e., these oxide films reach a kinetically limited thickness at which point the nickel from the underlying bulk begins to diffuse to the surface where it is oxidized to NiO. Upon elevated temperature (generally at least 200° C.) hydrogen reduction, the NiO is reduced to nickel metal which acts as the catalytic center for the hydrogenation. There does, however, appear to be a small amount of the more stable metal oxide intimately intermixed with the nickel metal overlayer, which may give rise to the enhanced catalytic activity and stability observed for the high temperature oxidized and reduced intermetallic alloys, as compared to pure nickel.

Figure 19:
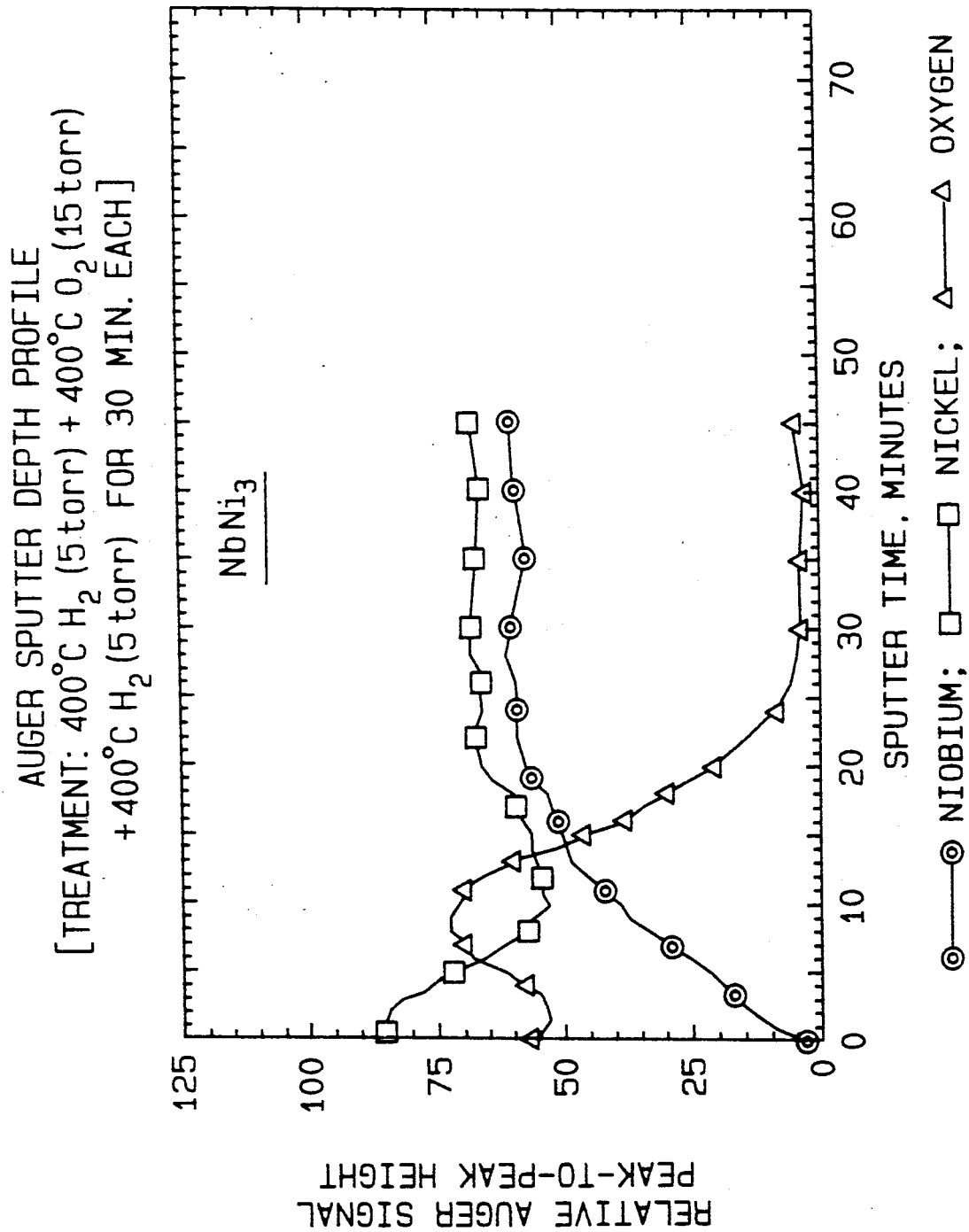
FIG. 19 is a graph showing the Auger sputter depth profile of $NbNi_3$ after an oxidation/reduction treatment which shows the change in Nb, Ni, and oxygen concentration as a function of depth into the sample.
Figure 20:
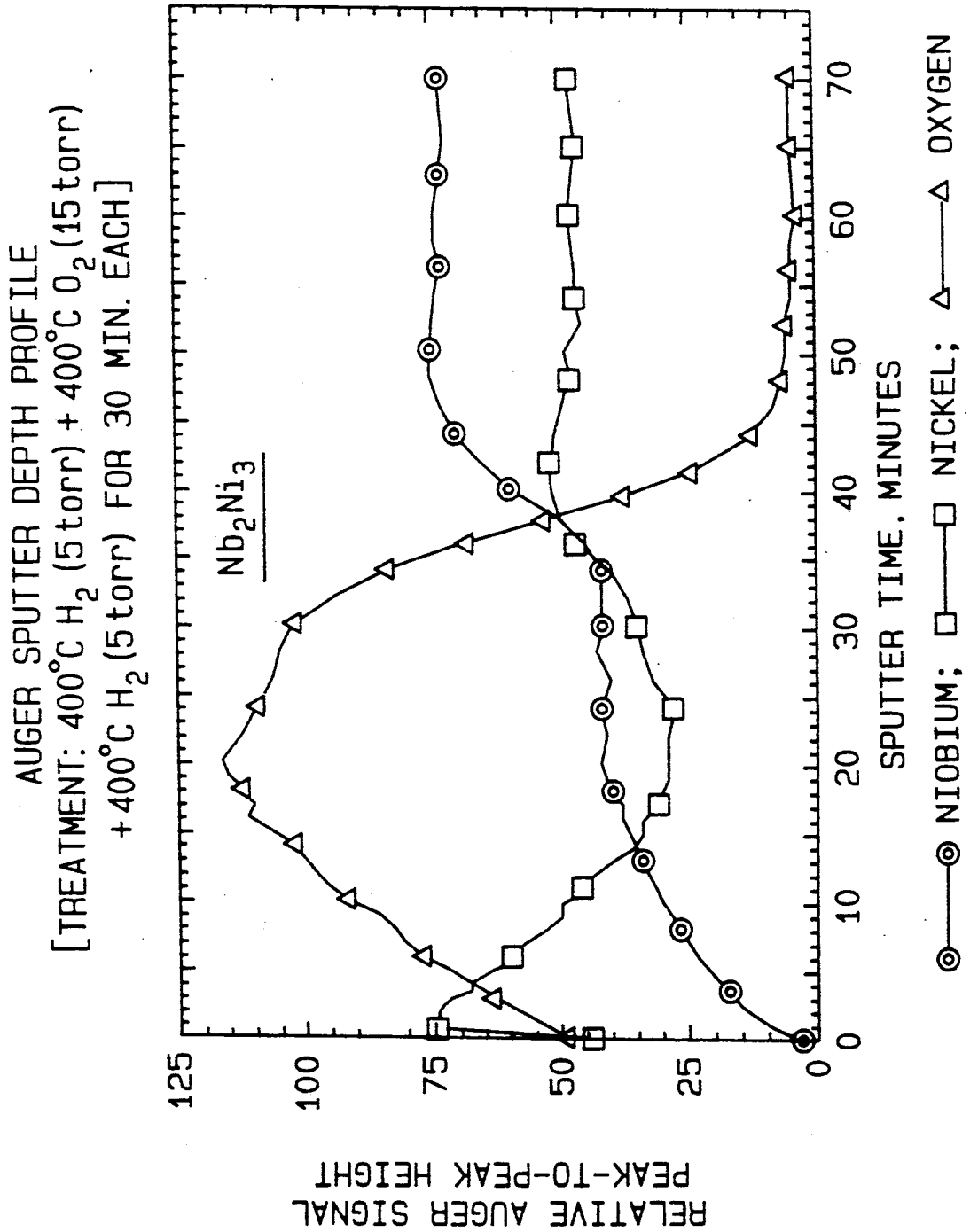
FIG. 20 is a graph similar to FIG. 19 for $Nb_2Ni_3$.

The results of Auger depth profiles of a NbNi$_3$ and a Nb$_2$Ni$_3$ polished slice after the following treatment: 400° C. H$_2$ (5 torr); followed by 400° C. O$_2$ (15 torr); followed by 400° C. H$_2$ (5 torr), for 30 min. each treatment, are shown in FIG. 19 and 20, respectively. The depth profiles were obtained using a 3 keV Ar$^+$ beam to slowly erode away the surface of the sample by the sputtering process induced by the ion beam.

The sample is analyzed by Auger spectroscopy after a set sputtering interval such that the composition is determined as a function of depth into the material as the material itself is slowly removed by the Ar$^+$ beam. The data presented in FIGS. 19 and 20 are only the relative Auger signal peak-to-peak heights which are not directly related to a relative concentration, as the elemental sensitivity factors have not been accounted for. The data, however, do indicate a change in composition as a function of depth. During the first minute of sputtering, as can be seen in these figures, the surface carbon is removed (samples were air exposed after treatment), which exposes the surface. The surface of both compounds has been enriched in Ni due to the treatment, however, niobium is present as an oxide, which accounts for the large oxygen signal. As the nickel is sputtered away, more of the niobium oxide is uncovered as evidenced by the decline in the Ni signal and an increase in both the Nb and O signals. A subsurface region is reached in both samples (8 min. of sputtering for NbNi$_3$ and after 20 min. for Nb$_2$Ni$_3$) which consists of a mixed phase of $NiO/Nb_2O_3$. As compared to the $NbNi_3$ sample, the $Nb_2Ni_3$ sample has a higher relative proportion of $Nb_2O_3$ in the mixed oxide phase. This mixed oxide phase also is considerably thicker in the $Nb_2Ni_3$ than in the $NbNi_3$. With continued sputtering, the mixed oxide phase is removed and the Ni and Nb concentrations increase (oxygen is being removed), eventually reaching the bulk composition (after 30 min. for $NbNi_3$ and after 50 min. for $Nb_2Ni_3$). These data indicate that both compounds should be catalytically active as the surfaces have been enriched in Ni following the activation treatment. Indeed, the $NbNi_3$ compound turned out to be catalytically active, as is shown in FIG. 2, although not as active as the Zr/Ni compounds.

For the Zr/Ni compounds, however, the surface is entirely Ni metal, with very little $ZrO_2$ present until much deeper into the surface. This greater amount of surface Ni present on the activated Zr/Ni compounds is undoubtedly responsible for their higher catalytic hydrogenation activity.

Figure 21:
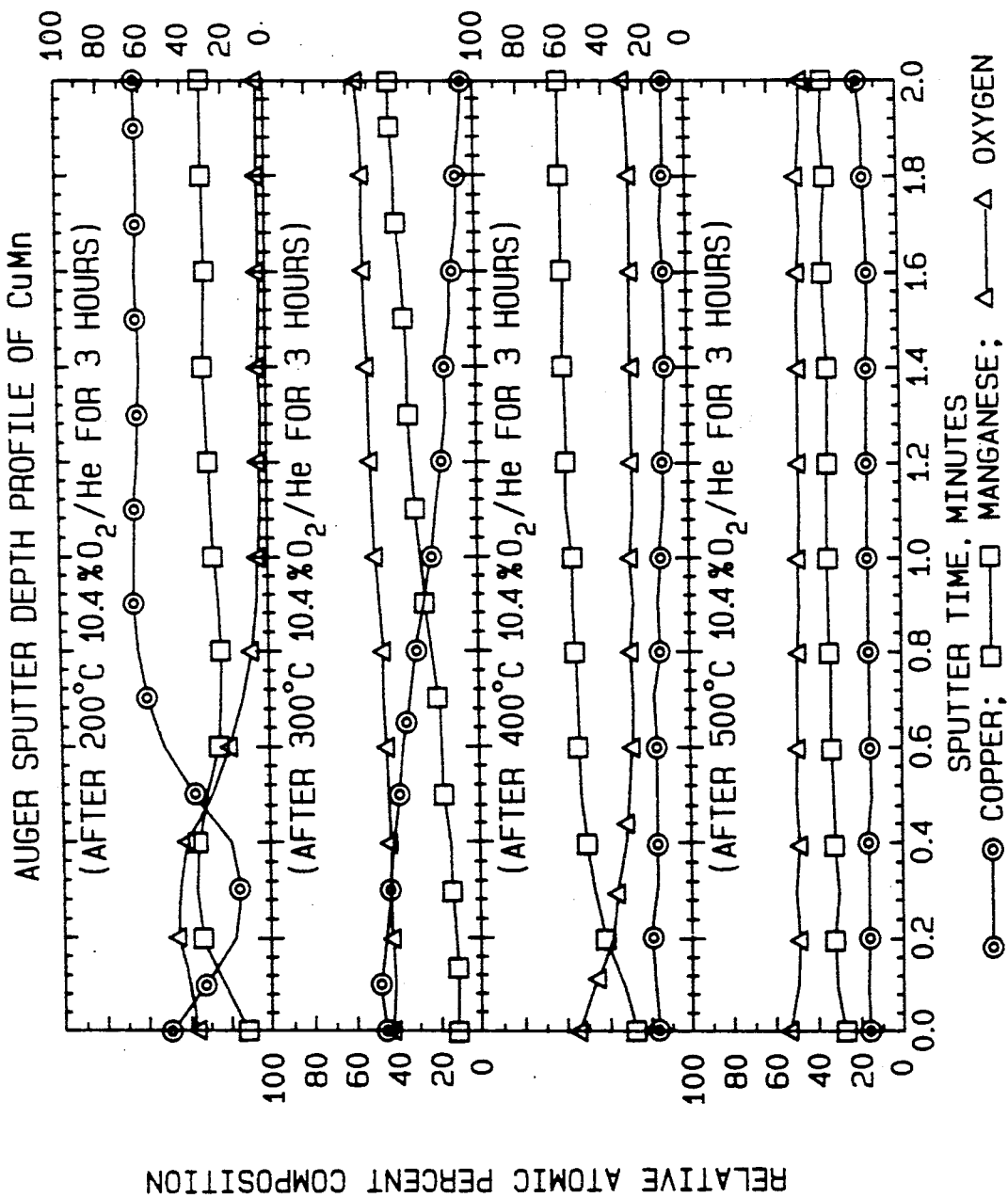
FIG. 21 is a graph showing Auger sputter depth profile for a CuMn alloy after it had been oxidized in a flowing 10.4% $O_2$/ 89.6% He gas mixture for 3 hours at different temperatures.
Figure 22:
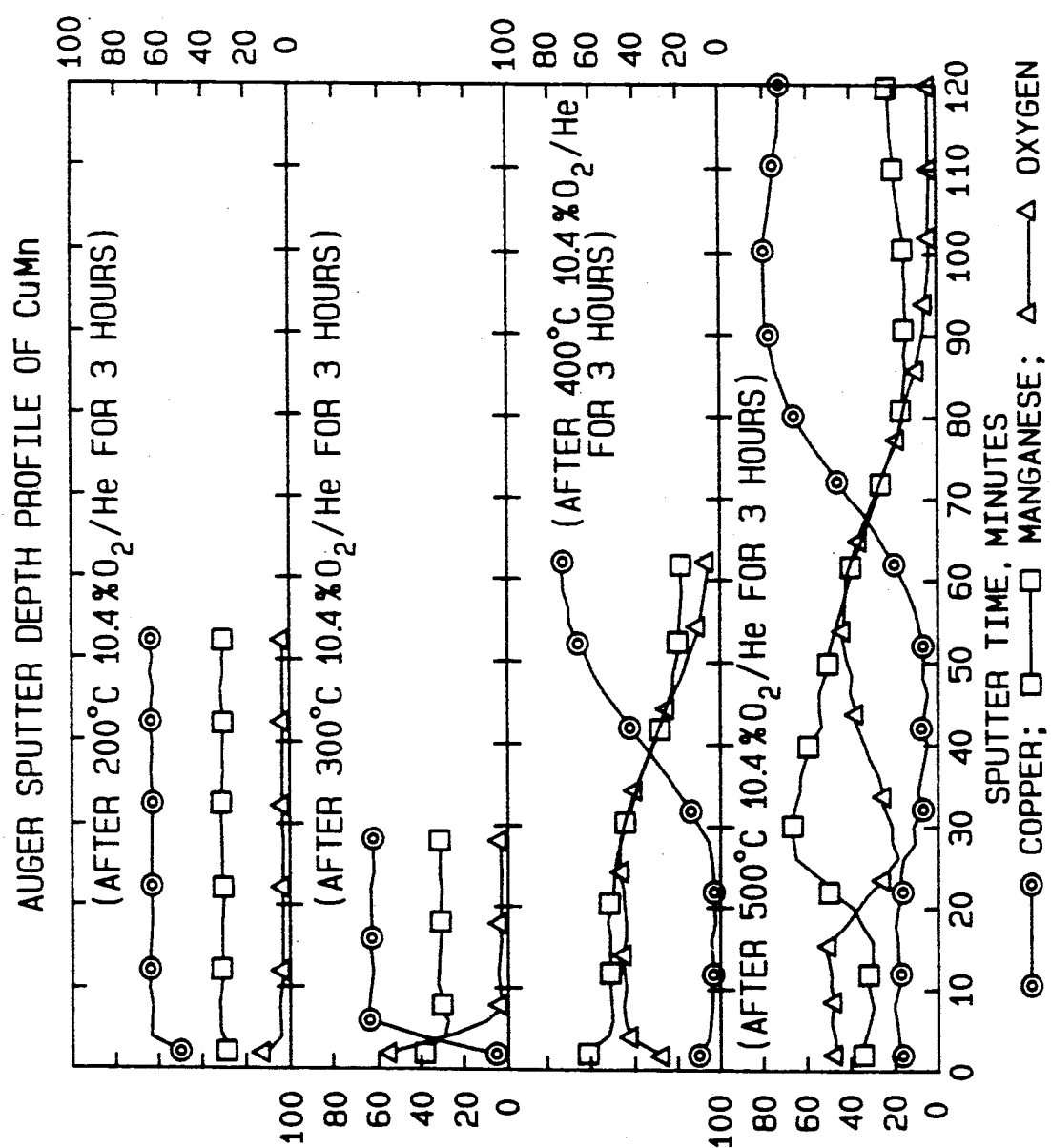
FIG. 22 is a graph similar to FIG. 21.

The treated oxidation catalysts processed in accordance with the present invention are useful for a variety of reactions, including the oxidation of carbon monoxide to carbon dioxide ($2CO + O_2 = 2CO_2$) and hydrocarbons to water and carbon dioxide. These reactions are relevant to pollution control and to automobile exhaust emission control. A known, highly active oxidation catalyst, known as Hopcalite, consists of a mixed metal oxide containing copper and manganese oxides, generally in the form of a spinel having the composition $CuMn_2O_4$. Shown in FIGS. 21, 22 and 23 are Auger depth profiles of two alloys (CuMn and $Cu_{0.63}Mn_{0.37}$, both prepared by arc melting) after they had been oxidized in a 10.4% $O_2$/89.6% He gas stream at various temperatures for 3 hour periods. As can be seen in FIGS. 21 and 22 after a 200° C. treatment, the samples' surface has been converted to a mixed metal oxide system, with a greater proportion of copper oxide than manganese oxide. Below this outer mixed oxide phase is another mixed oxide phase, this one enriched in manganese oxide.

At greater depths, both alloys approach their bulk copper and manganese compositions. After the 300° C. treatment, a similar mixed oxide stratification as described above results, only the thickness of the mixed oxide phases increases. A big difference between the two alloys occurs after the 400° C. treatment where at the surface of the CuMn alloy a greatly enriched manganese oxide-mixed oxide phase is formed, but on the $Cu_{0.63}Mn_{0.37}$ alloy a greatly enriched copper oxide-mixed oxide phase is formed. After the 500° C. treatment, the surfaces of both alloys have formed the same phase, which appears to be a crystalline $CuMn_2O_4$ spinel. It should be pointed out that elemental sensitivity factors were used to calculate the atomic composition profiles, thus leading to some error in the absolute magnitude of the displayed values.

These results illustrate the remarkable variation in a material's surface composition that can result from changes in alloy bulk composition, temperature and the chemical treatment to which the material is exposed. In FIG. 23 are shown the longer time (i.e., greater depth) profiles for the CuMn alloy after the four oxidation treatments. These data show that considerable compositional variation as a function of depth can occur in these alloys upon simple oxidation at various temperatures. The successful preparation of a surface $CuMn_2O_4$ spinel (an active oxidation catalyst) indicates other oxidation catalysts with even higher activity can be prepared in this manner. The Zr and Hf/Ni compounds in particular were shown to possess good catalytic hydrogenation properties. It was also demonstrated that these same compounds are less prone to deactivation by sulfur poisoning and that they can be repeatedly reactivated using high temperature, successive oxidation/reduction treatments.

Although the present invention has been described in terms of a specific environment, it will be clear to one skilled in the art that various modifications can be made in the materials, structures and procedures within the scope of the accompanying claims.

The embodiment of the invention in which an exclusive property of privilege is claimed is defined as follows:

1. A method of treating a sulfur-poisoned intermetallic alloy hydrogenation catalyst, selected from the group consisting of $HfNi_3$, $TiNi_3$, MoNi, $NbNi_3$, MnNi, $AlNi_3$, $Si_2Ni$, TiNi, $TiPt_3$, $ZrPt_3$, and $HfPt_3$, to improve the sulfur impurity poisoning resistance of the catalyst so that the catalyst maintains a sufficient degree of catalytic hydrogenation activity after being subjected to reactant stream sulfur-bearing impurities comprising:

treating the sulfur-poisoned intermetallic alloy hydrogenation catalyst by contacting the sulfur-poisoned intermetallic alloy hydrogenation catalyst with an oxygen-containing gas at a temperature of at least about 200° C.; and contacting the treated catalyst with a reducing gas at a temperature of at least 200° C.

2. The method of claim 1 wherein the reducing gas includes hydrogen.

3. The method of claim 2 wherein the sulfur-poisoned intermetallic alloy hydrogenation catalyst is first contacted with hydrogen prior to contacting the sulfur-poisoned intermetallic alloy hydrogenation catalyst with the oxygen containing gas.

4. The method of claim 1 wherein the sulfur-poisoned intermetallic alloy hydrogenation catalyst is contacted with oxygen at a temperature in the range of about 400° C. to about 550° C. and the sulfur-poisoned intermetallic alloy hydrogenation catalyst is contacted with the reducing gas at a temperature in the range of about 400° C. to about 550° C.

5. The method of claim 1 wherein the successive reduction and oxidation treatments are continued for at least one-half hour each.

6. The method of claim 5 wherein the treatments are continued for a period of one to three hours each.

7. The method of claim 1 wherein the oxygen-containing gas includes $O_2$ in an amount of about 0.5 mole percent to about 20 mole percent.

8. The method of claim 7 wherein the oxygen-containing gas includes $O_2$ in an amount of about 0.75 mole percent to about 5 mole percent.

9. The method of claim 1 wherein the reducing gas is included in an amount of about 50 molar percent to about 95 molar percent of the reducing gas composition.

10. The method of claim 9 wherein the reducing gas is included in an amount of about 60 molar percent to about 90 molar percent of the reducing gas composition.

11. The method of claim 1 wherein the reducing gas is hydrogen included in a $H_2$/CO gas mixture in a molar ratio of about 3 moles of $H_2$ per mole of CO, calculated at standard temperature and pressure.

12. The method of claim 1 wherein the reducing gas is hydrogen in an amount of at least about 50 molar percent within an inert gas.

13. The method of claim 1 further comprising the steps of:

contacting said treated sulfur-poisoned intermetallic alloy hydrogenation catalyst with sulfur-bearing gas impurities to cause deactivation of said treated sulfur-poisoned intermetallic alloy hydrogenation catalyst; and regenerating said deactivated sulfur-poisoned intermetallic alloy hydrogenation catalyst by subjecting said deactivated sulfur-poisoned intermetallic alloy hydrogenation catalyst to alternate, successive oxidation and reduction treatments, in either order, each at a temperature and for a time sufficient to restore the catalytic hydrogenation activity of the treated sulfur-poisoned intermetallic alloy hydrogenation catalyst.

14. The method of claim 13 wherein the regenerated said deactivated sulfur-poisoned intermetallic alloy hydrogenation catalyst has not been oxidized at 200° C. or above after a final reduction treatment of 200° C. or above.

* * * * *